(12) United States Patent
Schaefer et al.

(10) Patent No.: US 12,038,806 B2
(45) Date of Patent: Jul. 16, 2024

(54) EVALUATION OF MEMORY DEVICE HEALTH MONITORING LOGIC

(71) Applicant: Micron Technology, Inc., Boise, ID (US)

(72) Inventors: Scott E. Schaefer, Boise, ID (US); Aaron P. Boehm, Boise, ID (US); Scott D. Van De Graaff, Boise, ID (US); Mark D. Ingram, Boise, ID (US); Todd Jackson Plum, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 71 days.

(21) Appl. No.: 17/807,813

(22) Filed: Jun. 20, 2022

(65) Prior Publication Data

US 2023/0393935 A1    Dec. 7, 2023

Related U.S. Application Data

(60) Provisional application No. 63/365,733, filed on Jun. 2, 2022.

(51) Int. Cl.
| | |
|---|---|
| *G11C 29/00* | (2006.01) |
| *G06F 9/30* | (2018.01) |
| *G06F 11/07* | (2006.01) |
| *G06F 11/10* | (2006.01) |
| *G06F 11/30* | (2006.01) |

(52) U.S. Cl.
CPC ...... *G06F 11/1068* (2013.01); *G06F 9/30189* (2013.01); *G06F 11/0772* (2013.01); *G06F 11/3051* (2013.01)

(58) Field of Classification Search
CPC .................................................. G06F 9/30189
See application file for complete search history.

(56) References Cited

U.S. PATENT DOCUMENTS

| | | | |
|---|---|---|---|
| 10,628,275 B2* | 4/2020 | Terechko | G06F 11/27 |
| 11,144,235 B1* | 10/2021 | Lyons | G06F 3/0673 |
| 2007/0157011 A1* | 7/2007 | Kumar | G06F 11/1417 |
| | | | 713/1 |
| 2013/0159797 A1* | 6/2013 | Peng | G11C 16/349 |
| | | | 714/E11.001 |
| 2017/0371689 A1* | 12/2017 | Natu | G06F 11/30 |
| 2021/0057036 A1* | 2/2021 | Khan | H01L 25/18 |

(Continued)

*Primary Examiner* — Samir W Rizk
(74) *Attorney, Agent, or Firm* — Holland & Hart LLP

(57) ABSTRACT

Methods, systems, and devices for evaluation of memory device health monitoring logic are described. For example, a memory device may include health monitoring logic operable to activate certain internal health monitors of a set of multiple monitors and to communicate an output associated with the activated monitors. In a first mode of operation, the health monitoring logic may provide a single output that is generated from multiple outputs of the set of monitors. In a second mode of operation, the health monitoring logic may cycle through certain monitors (e.g., in a test mode), and may generate an output corresponding to respective active monitors as it cycles through the set of monitors. The health monitoring logic may communicate an output specific to each monitor to a host device such that the host device may evaluate an output from each monitor of the set of monitors.

35 Claims, 11 Drawing Sheets

(56) References Cited

U.S. PATENT DOCUMENTS

2022/0317916 A1\* 10/2022 Boehm ................ G06F 3/0604
2023/0315599 A1\* 10/2023 Schaefer ............ G06F 11/0772
714/718

\* cited by examiner

EVALUATION OF MEMORY DEVICE HEALTH MONITORING LOGIC

CROSS REFERENCE

The present application for patent claims the benefit of U.S. Provisional Patent Application No. 63/365,733 by Schaefer et al., entitled "EVALUATION OF MEMORY DEVICE HEALTH MONITORING LOGIC," filed Jun. 2, 2022, assigned to the assignee hereof, and expressly incorporated by reference herein.

FIELD OF TECHNOLOGY

The following relates to one or more systems for memory, including evaluation of memory device health monitoring logic.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
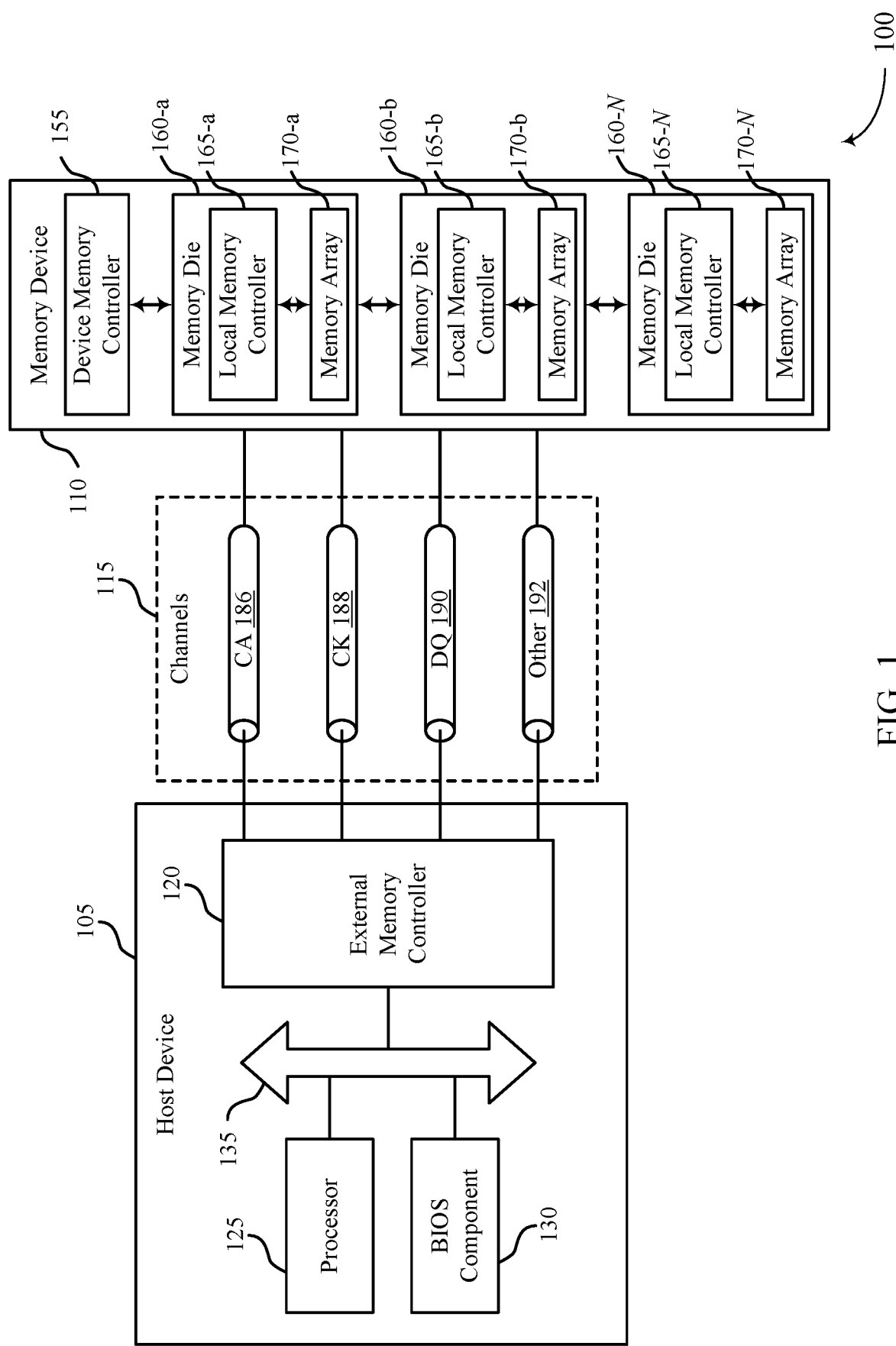
FIG. 1 illustrates an example of a system that supports evaluation of memory device health monitoring logic in accordance with examples as disclosed herein.

Memory devices may include components (e.g., circuitry, semiconductor die structures, transistors, memory cells) that change over time, over an accumulation of access operations, or over an accumulation of stress (e.g., electrical stress, thermal stress, mechanical stress), among other conditions, and such changes may degrade performance of the memory device (e.g., degrade a capability for writing, maintaining, or reading information). Some memory devices may include logic, such as health monitoring logic (e.g., degradation monitoring logic, wear monitoring logic), that may be configured to monitor for degradation (e.g., wear or other parameters) and to notify another device (e.g., a host device) of a status of the memory device, or a status of one or more components thereof, such as a degradation status or an end-of-life status (e.g., a degradation fault, a degradation warning). In some examples, health monitoring logic may include a set of multiple internal monitors (e.g., internal process monitors), where each internal monitor may correspond to a different degradation metric, a different monitored component, or a different degradation level of the memory device. In some such examples, outputs from the set of internal monitors may be combined to generate a single output (e.g., a flag, a fault flag, an aggregated degradation metric) that is monitored by the host device to evaluate degradation. However, for implementations in which health monitoring logic provides a single output to a host device, the health monitoring logic may provide limited insight into each monitored degradation metric or component of the memory device as well as the internal health monitors themselves.

In accordance with examples as disclosed herein, a memory device may include health monitoring logic operable to cycle through a set of multiple internal monitors (e.g., individually) and to communicate an output associated with the cycled internal health monitors (e.g., to a host device). For example, the health monitoring logic may provide a single output (e.g., an aggregated output) to a host device from outputs of the set of internal monitors in a first mode of operation, and, in some cases, may switch to a second mode of operation (e.g., in a host-initiated test mode, if a fault is detected). In the second mode of operation, the health monitoring logic may activate internal monitors (e.g., selectively activate one-by-one while remaining internal monitors are bypassed or otherwise inactivated), and may generate an output corresponding to the currently active internal monitor as it cycles through the set of internal monitors. The health monitoring logic may communicate an output specific to each internal monitor to the host device such that the host device may evaluate an output from each internal monitor of the set of internal monitors. Such configurations of health monitoring logic may be implemented to provide greater insight into each degradation metric or monitored component of the memory device as well as a status of the internal monitors themselves.

Features of the disclosure are initially described in the context of systems and dies as described with reference to FIGS. 1 and 2. Features of the disclosure are described in the context of a degradation diagram, health monitoring logic, a memory architecture, and a process flow as described with reference to FIGS. 3 through 6. These and other features of the disclosure are further illustrated by and described with reference to an apparatus diagram and flowcharts that relate to evaluation of memory device health monitoring logic as described with reference to FIGS. 7 through 11.

FIG. 1 illustrates an example of a system 100 that supports evaluation of memory device health monitoring logic in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A memory device 110 may include components (e.g., circuitry, semiconductor die structures, transistors, memory cells) that change over time, over an accumulation of access operations, or over an accumulation of stress, among other conditions, and such changes may degrade performance of the memory device 110. In some examples, a memory device 110 (e.g., a device memory controller 155, a local memory controller 165) may include logic, such as health monitoring logic, that may be configured to monitor for degradation and to notify another device (e.g., a host device 105, over a channel 115) of a status of the memory device 110, or a status of one or more components thereof, such as a degradation status or an end-of-life status. In some examples, health monitoring logic may include a set of multiple internal monitors, where each internal monitor may correspond to a different metric, monitored component, or degradation level of the memory device 110. In such examples, outputs from the set of internal monitors may be combined to generate a single output that is monitored by the host device 105 to evaluate degradation. However, for implementations in which health monitoring logic provides a single output (e.g., to the host device 105), the health monitoring logic may provide limited insight into each monitored degradation metric or component of the memory device 110 as well as the internal health monitors themselves.

In accordance with examples as disclosed herein, a memory device 110 (e.g., a device memory controller 155, a local memory controller 165) may include health monitoring logic operable to cycle through a set of multiple internal monitors and to communicate an output associated with the cycled internal health monitors to a host device 105. For example, the health monitoring logic may provide a single output to the host device 105 generated from outputs of the set of internal monitors in a first mode of operation, and, in some cases, may switch to a second mode of operation (e.g., in a test mode initiated by a host device 105, if a fault is detected). In the second mode of operation, the health monitoring logic may activate internal monitors (e.g., selectively activate one-by-one while remaining internal monitors are bypassed or otherwise inactive), and may generate an output corresponding to the currently active internal monitor as it cycles through the set of internal monitors. The health monitoring logic may communicate an output specific to each internal monitor to the host device 105 such that the host device 105 may evaluate an output from each internal monitor of the set of internal monitors. Such configurations of health monitoring logic may be implemented to provide greater insight into each monitored metric or component of the memory device 110 as well as a status of the internal monitors themselves.

Figure 2:
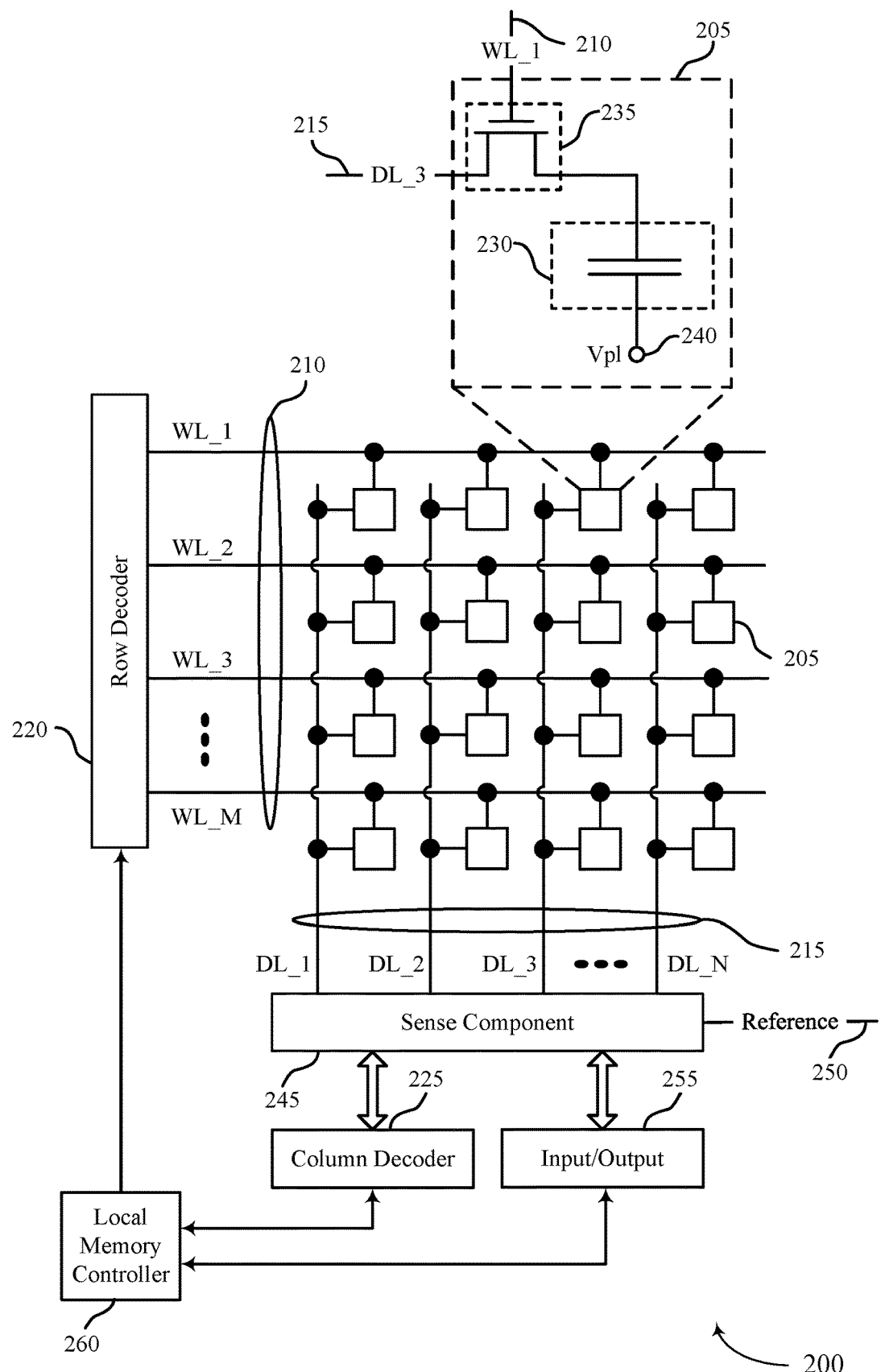
FIG. 2 illustrates an example of a memory die that supports evaluation of memory device health monitoring logic in accordance with examples as disclosed herein.

FIG. 2 illustrates an example of a memory die 200 that supports evaluation of memory device health monitoring logic in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210 and digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or a combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

One or more components of a memory die 200 may change over time, over an accumulation of access operations, or over an accumulation of stress, among other conditions, and such changes may degrade performance of the one or more components of the memory die 200. In some examples, a memory die 200 (e.g., a local memory controller 260) may include logic, such as health monitoring logic, that may be configured to monitor for degradation of the memory die 200 and to notify another device (e.g., a host device 105) of a status of the memory die 200, or a status of one or more components thereof, such as a degradation status or an end-of-life status. In some examples, health monitoring logic may include a set of multiple internal monitors, where each internal monitor may correspond to a different degradation metric, a different monitored component, or a different degradation level of the memory die 200. In such examples, outputs from the set of internal monitors may be combined to generate a single output that is monitored by the host device 105 to evaluate degradation. However, for implementations in which health monitoring logic provides a single output, the health monitoring logic may provide limited insight into each monitored degradation metric or component of the memory die 200 as well as the internal health monitors themselves.

In accordance with examples as disclosed herein, a memory die 200 (e.g., a local memory controller 260) may include health monitoring logic operable to cycle through a set of multiple internal monitors and to communicate an output associated with the cycled internal health monitors (e.g., to a device memory controller 155, to a host device 105). For example, the health monitoring logic may provide a single output generated from outputs of the set of internal monitors in a first mode of operation, and, in some cases, may switch to a second mode of operation (e.g., in a host-initiated test mode, if a fault is detected). In the second mode of operation, the health monitoring logic may cycle through internal monitors and generate an output corresponding to a currently active internal monitor as it cycles through them. The health monitoring logic may communicate an output specific to each internal monitor to the host device 105 such that the host device 105 may evaluate an output from each internal monitor of the set of internal monitors. Such configurations of health monitoring logic may be implemented to provide greater insight into each monitored metric or component of the memory die 200 as well as a status of the internal monitors themselves.

Figure 3:
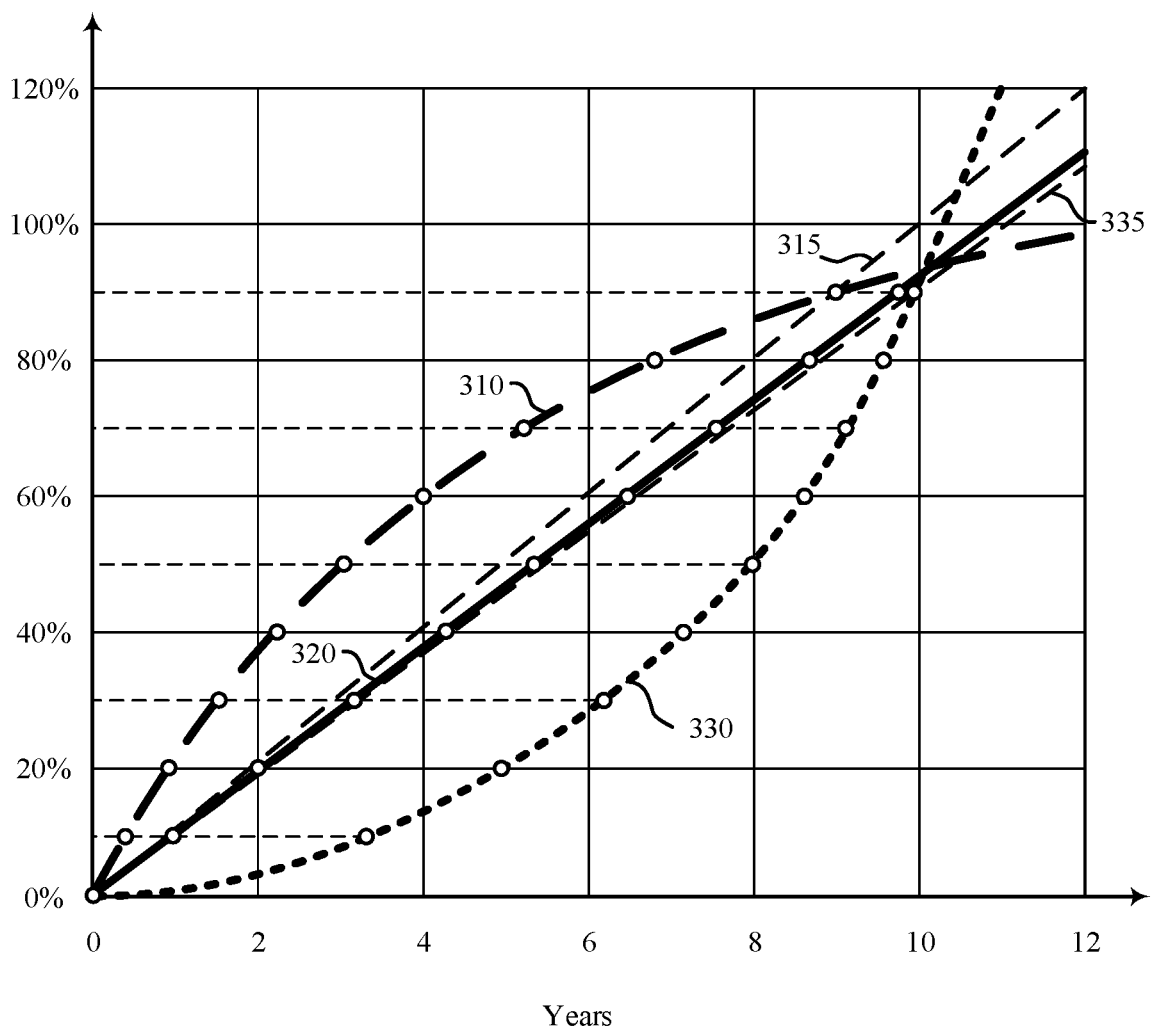
FIG. 3 illustrates an example of a degradation diagram that supports evaluation of memory device health monitoring logic in accordance with examples as disclosed herein.

FIG. 3 illustrates an example of a degradation diagram 300 that supports evaluation of memory device health monitoring logic in accordance with examples as disclosed herein. The degradation diagram 300 illustrates three example degradation profiles, including a first degradation profile 310 (e.g., a decelerating degradation profile), a second degradation profile 320 (e.g., a linear degradation profile), and a third degradation profile 330 (e.g., an accelerating degradation profile). Each degradation profile may be associated with a level of degradation (e.g., a level of wear) of a respective component of, for example, a memory device 110 over time, one or more of which may be monitored by the memory device 110, or a host device 105 that is coupled with the memory device 110.

Each degradation profile may be associated with a respective metric (e.g., a degradation metric, a degradation level, a degradation mechanism, a degradation phenomenon), which may be normalized relative to a life expectancy (e.g., expressed as a percentage of life expectancy). In various examples, a degradation metric or profile may be associated with a threshold voltage drift, a current drive drift, hot carrier stress degradation, negative bias temperature instability (NBTI) stress degradation, a dielectric degradation, a charge capacity (e.g., capacitance, polarization) degradation, a material state degradation, or other degradation. In some examples, a degradation profile may be associated with a respective transistor type (e.g., an N-type metal oxide semiconductor (NMOS) or a P-type metal oxide semiconductor (PMOS) transistor). In some examples, different metrics may be evaluated for different types of components, which may include different metrics being evaluated for different transistors, diodes, capacitors, resistors, oscillators, metal lines (e.g., measuring electromigration in the lines), different dielectric portions (e.g., measuring charge leakage), or other components of a memory device 110, or portions thereof.

In the example of degradation diagram 300, the first degradation profile 310 may be associated with degradation of a first metric, such as a threshold voltage degradation of a first transistor (e.g., a PMOS transistor) over time, which may be an example of a decelerating degradation phenomenon. The third degradation profile 330 may be associated with a degradation of a second metric, such as a threshold voltage degradation of a second transistor (e.g., an NMOS transistor) over time, which may be an example of an accelerating degradation phenomenon. The second degradation profile 320 may be associated with a degradation of a third metric, or may represent a linear (e.g., normalized, averaged) degradation of one or more metrics (e.g., an average of the first metric and second metric). Although three degradation profiles are illustrated in the degradation diagram 300, a memory device 110 may monitor any quantity of one or more metrics (e.g., and associated degradation profiles) associated with a respective component, including the metrics listed herein, or other metrics not explicitly described herein.

In some cases, health monitoring logic of a memory device 110 may support notifying another device, such as a host device 105, when a metric satisfies a threshold or fails to satisfy a threshold, which may indicate that a threshold level of degradation (e.g., 90 percent of a life expectancy, or some other threshold level) of an associated component is satisfied. For example, for a component of the memory device 110 associated with the first degradation profile 310, the memory device 110 may determine that the component has reached a threshold of 90 percent of life expectancy (e.g., a 90 percent threshold level of degradation) at around the ninth year of operating the memory device 110. In some examples, a host device 105 may receive an indication of such a determination, and may determine or indicate device or operational information, such as a health status or warning information, based on the indication that the threshold level of degradation is satisfied.

In some cases, a memory device 110 or a host device 105 may not be aware of a degradation profile, or characteristic thereof (e.g., a degradation slope, a degradation acceleration, a degradation deceleration), associated with a monitored component of the memory device 110, and may rely on an assumption that degradation of the monitored component follows a default profile, such as a linear profile (e.g., as illustrated by the second degradation profile 320), or some other assumed degradation profile (e.g., a nominal degradation profile). For example, based on determining a 90 percent threshold level of degradation of the first metric at approximately nine years of operation, logic of a memory device 110 or a host device 105 may assume that the component associated with the first metric would reach 100 percent of the estimated life expectancy at approximately the tenth year of operating the memory device (e.g., based on a linear extrapolation 315), which may be overly conservative because the component may reach such a threshold at a time that is closer to the twelfth year of operating the memory device 110 (e.g., as illustrated by the first degradation profile 310). In another example, for a component of the memory device 110 associated with the third degradation profile 330, the memory device 110 may identify that the component has reached a threshold of 90 percent of life expectancy at nearly the tenth year of operating the memory device 110. However, logic of a memory device 110 or a host device 105 may assume that the component associated with the third metric would reach 100 percent of the estimated life expectancy at approximately the eleventh year of operating the memory device (e.g., based on a linear extrapolation 335), which may overestimate a remaining operable life because the component may reach such a threshold before the eleventh year of operating the memory device 110 (e.g., as illustrated by the third degradation profile 330).

In some examples, differences in degradation profiles between different components of a memory device 110 may result in varying accuracy for estimating remaining operable life of the memory device 110, or some portion thereof. Accordingly, health monitoring logic of a memory device 110 may be operable to evaluate different threshold levels of degradation, which may support the health monitoring logic evaluating whether a degradation phenomenon is decelerating (e.g., in accordance with the first degradation profile 310), linear (e.g., in accordance with the second degradation profile 320), or accelerating (e.g., in accordance with the third degradation profile 330), among other examples. For example, health monitoring logic may evaluate respective metrics for different components in accordance with ten percent life expectancy intervals (e.g., evaluating in accordance with a value of the metric at each ten percent of life expectancy), such that a host device 105 or a memory device 110 may perform a curve fit between evaluations over time of multiple degradation levels over time in order to perform an estimate of an end of an operable life of the memory device 110.

In some examples, configuration of the health monitoring logic at different threshold degradation levels may be controlled (e.g., commanded, requested) by a host device 105, which may include the host device 105 setting a threshold degradation level for evaluations by the health monitoring logic. A memory device 110 coupled with such a host device 105 may indicate when a threshold degradation level has been satisfied, which may be followed by the host device 105 setting a different threshold degradation (e.g., a subsequent wear level) for the health monitoring logic. For example, health monitoring logic may initially evaluate whether a threshold of ten percent of life expectancy has been satisfied and, based at least in part on determining and indicating that the threshold of ten percent of life expectancy has been satisfied, may be configured (e.g., controlled, commanded, requested) to evaluate whether a threshold of twenty percent of life expectancy has been satisfied, and so on. Such techniques may enable a system (e.g., a system 100) to predict end-of-life conditions for a memory device 110 more accurately than when assuming a degradation profile, which may improve reliability of the system.

In some examples, health monitoring logic of a memory device 110 may monitor multiple metrics, or multiple components, or any combination thereof in accordance with multiple degradation levels, which may be implemented as a set of multiple internal monitors (e.g., via multiple monitoring circuits). In some examples, the health monitoring logic may output an indication that the memory device 110 (e.g., as a whole) or some set of components thereof has satisfied a threshold level of degradation if any one or more of the internal monitors indicate that a corresponding threshold level of degradation has been satisfied (e.g., as a combined result, as an aggregate result). Although such aggregation may support relatively low overhead, or a relevant overall state of the memory device 110, such techniques may not provide insight into which of a set of internal monitors has satisfied its respective threshold level of degradation.

In accordance with examples as disclosed herein, health monitoring logic may support being enabled in multiple configurations, such that the health monitoring logic may output a respective indication for each of multiple internal monitors by sweeping through the multiple internal monitors. For example, a host device 105 may transmit one or more indications (e.g., a command, a request, an instruction, a cycle indication, a sequence of indications) to the memory device 110 (e.g., to initiate a test mode) and, in response, the memory device 110 may initiate testing of multiple configurations of the health monitoring logic. Each configuration may correspond to activating a different internal monitor of the health monitoring logic (e.g., associated with a different degradation metric, associated with a different monitored component, associated with a different degradation level), such that the health monitoring logic may output an indication specific to a first internal monitor in accordance with a first configuration and may output an indication specific to a second monitor in accordance with a second configuration, among other examples. Accordingly, the health monitoring logic may support an aggregated evaluation of degradation via a relatively low-overhead interface (e.g., as a report of a general status of the memory device 110), and may also support a mode in which more-granular evaluations may be provided (e.g., for different degradation metrics, for different components that may be degrading at different rates), which may improve insight into degradation mechanisms of the memory device 110.

Figure 4:
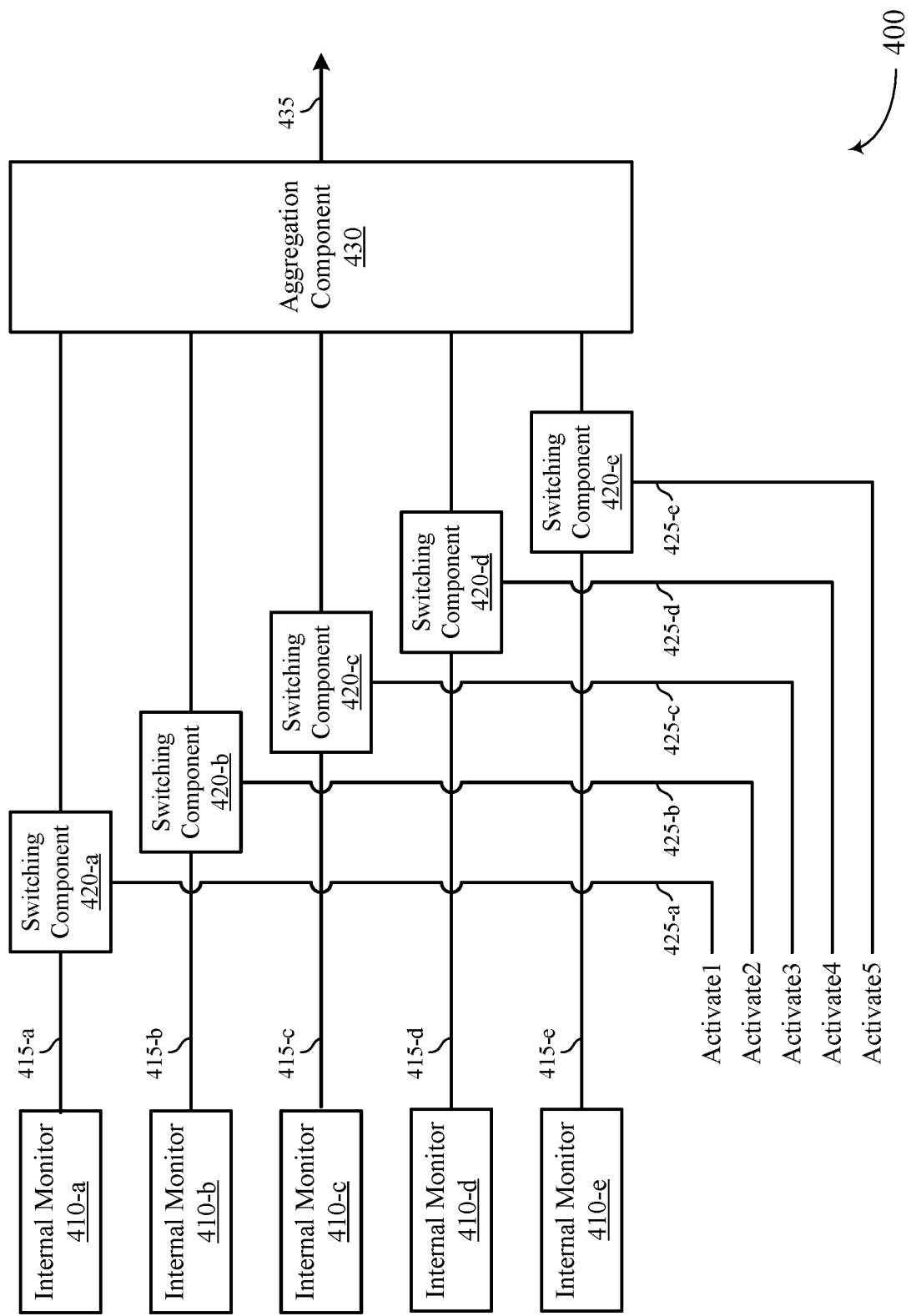
FIG. 4 illustrates an example of a health monitoring logic that supports evaluation of memory device health monitoring logic in accordance with examples as disclosed herein.

FIG. 4 illustrates an example of health monitoring logic 400 that supports evaluation of memory device health monitoring logic in accordance with examples as disclosed herein. For example, the health monitoring logic 400 illustrates a set of multiple internal monitors 410 (e.g., internal monitors 410-*a* through 410-*e*, process monitors, degradation monitors) that may support an output 435 (e.g., as output by an aggregation component 430, as a health monitor fault). The health monitoring logic 400 may illustrate an example for implementing health monitor selection at a memory device 110, and may be an example of aspects of a device memory controller 155 or a local memory controller 165 as described with reference to FIG. 1, or a local memory controller 260 as described with reference to FIG. 2.

The internal monitors 410 may be illustrative of components (e.g., circuitry, logic) configured to monitor degradation of various components of the memory device 110. For example, each internal monitor 410 may be configured to monitor a respective degradation metric (e.g., a respective degradation mechanism, a respective electrical or other characteristic associated with a particular degradation phenomenon), or to monitor a characteristic of a respective component (e.g., circuit element, circuit portion) of the memory device 110 that is associated with a particular degradation mechanism, or to monitor in accordance with a particular degradation level. Each internal monitor 410 may be configured to generate an output 415, which may indicate whether a degradation level or other characteristic that is monitored by the internal monitor 410 has satisfied (e.g., met, exceeded) a threshold degradation level. In some examples, each internal monitor 410 may be configurable with one of a set of multiple threshold degradation levels, which may support incremental evaluations of degradation per internal monitor 410 (e.g., to generate a degradation profile, as described with reference to FIG. 3).

The health monitoring logic 400 may also include an aggregation component 430, which may perform an aggregation of the results of the internal monitors 410 (e.g., an aggregation of the outputs 415) to generate the output 435. In some examples, the aggregation component 430 may be an OR gate, or another component (e.g., another type or gate or other logic) operable to provide an aggregate indication that a threshold level of degradation has been satisfied if any of the coupled internal monitors 410 indicate that the threshold level of degradation has been satisfied. In some examples, generating the output 435 using the aggregation component 430 may provide an overall indication (e.g., an initial indication, a conservative indication) of the level of degradation of the memory device 110 or set of components thereof (e.g., in accordance with multiple degradation mechanisms, as a general status of the memory device 110 or set of components thereof), which may be provided via a relatively low-overhead interface (e.g., as a single indication, rather than multiple indications). The output 435 may be provided to a register of the memory device 110 (e.g., a mode register), which may be monitored by a host device 105 to evaluate a degradation status of the memory device 110 that includes the health monitoring logic 400.

The health monitoring logic 400 may also include switching components 420, which may support different configurations of the health monitoring logic 400 (e.g., different activations of the internal monitors 410). For example, each switching component 420 may be a gate, a transistor, or another switch operable to couple a respective internal monitor 410 with the aggregation component 430, or to isolate the respective internal monitor 410 from the aggregation component 430, in response to a control input 425 (e.g., an activation input, a selection input). Although the example of health monitoring logic 400 includes a switching component 420 for each of the internal monitors 410, in some other examples, one or more of the switching components 420 may be omitted. For example, switching component 420-*e* may be omitted, such that the output 415-*e* is provided directly to the aggregation component 430, which may involve fewer resources (e.g., fewer circuit components, fewer activation signals, fewer bits of a configuration register) but may still support certain evaluations among the internal monitors 410 in accordance with examples as disclosed herein.

In some examples (e.g., during operation in a first mode, during operation in an aggregated mode), a set of multiple switching components 420, such as all of the switching components 420, may be configured to couple their respective internal monitor 410 with the aggregation component 430, such that the aggregation component 430 may generate the output 435 based on the coupled set of internal monitors 410 (e.g., internal monitors 410-*a* through 410-*e*, as an aggregation of all of the outputs 415). For example, in such a mode of operation, the aggregation component 430 may provide a certain indication if any of the set of coupled internal monitors 410 provides the certain indication (e.g., as an aggregated indication, as an aggregated general flag, as an aggregated fault). In such examples, the health monitoring logic 400 may provide an overall indication of the health of the monitored components of the memory device 110, such as an indication that at least one of the monitored components has satisfied a threshold level of degradation. However, with a set of multiple internal monitors 410 being coupled with the aggregation component 430, the output 435 may lack the granularity to indicate which of the internal monitors 410 may have generated a given indication.

In accordance with examples as disclosed herein (e.g., during operation in a second mode, during operation in a test mode, during operation in a cycled mode), the health monitoring logic 400 may also support one or more of the internal monitors 410 being coupled with the aggregation component 430 (e.g., via selected switching components 420) while one or more other internal monitors 410 are isolated from the aggregation component 430 (e.g., via deselected switching components 420). Thus, the switching components 420 illustrate an example of components that may support activating or deactivating various internal monitors 410 from an aggregated output (e.g., from the output 435). Accordingly, including the switching components 420 may support evaluating which of the internal monitors 410 has flagged a certain indication (e.g., which of the monitored components has reached a threshold level of degradation). In various examples, such a mode of operation may be commanded by a host device 105, or initiated by the memory device 110 that includes the health monitoring logic 400, based on various criteria.

In some examples, configuration of the health monitoring logic 400 in the described modes may be based at least in part on a register of a memory device 110 that includes the health monitoring logic 400. Such a register may be associated with a multi-bit field where different bits may indicate different aspects of the configuration. For example, such a configuration may be supported by a mode register MR122, where MR122 OP[2:0] (e.g., evaluation configuration bits of the mode register) may be associated with a health monitor sensitivity configuration of one or more of the internal monitors 410 (e.g., all of the internal monitors 410) and MR122 OP[7:3] (e.g., monitor selection bits of the mode register) may be associated with different configurations via the switching components 420.

In some such examples, a first value of MR122 OP[2:0] (e.g., MR122 OP[2:0]=000) may be associated with evaluation in accordance with a first percentage of life expectancy, such as a 100% life expectancy, and a second value of MR122 OP[2:0] (e.g., MR122 OP[2:0]=001) may be associated with evaluation in accordance with a second percentage of life expectancy, such as a 90% life expectancy, and so on. In some examples, the same value of MR122 OP[2:0] may be provided to all of the internal monitors 410, or the internal monitors 410 may otherwise be configured to evaluate the same threshold level of degradation (e.g., where certain ones of the internal monitors 410 may be internally enabled or disabled based on a value of MR122 OP[2:0]), which may support an aggregate evaluation by the health monitoring logic 400 (e.g., via output 435) at the same threshold level of degradation. In some examples, certain bits of MR122 OP[7:3] may correspond to the activation of different internal monitors. For example, MR122 OP[3] may be used to activate internal monitor 410-*a* (e.g., as an Activate1 signal, activating switching component 420-*a*, coupling internal monitor 410-*a* with the aggregation component 430), MR122 OP[4] may be used to activate internal monitor 410-*b*, and so on. In some examples (e.g., in accordance with a test mode), a single bit of MR122 OP[7:3] may be set to a certain value (e.g., a logic 0, which may correspond to a relatively low-energy state for activating the switching components 420) to activate a single internal monitor 410, or a subset of multiple bits of MR122 OP[7:3] may be set to the certain value to activate a subset of multiple internal monitors 410. In some other examples (e.g., in an aggregated mode), each of the bits of MR122 OP[7:3] may be set to the certain value to activate all of the internal monitors 410. Although such an illustrative example is described in the context of an eight-bit register, such techniques may be applied with a mode register having any quantity of bits.

In some examples, values of such a register may be written by a host device 105 (e.g., based on the host device 105 transmitting one or more mode register write commends), which may be an example of a host device 105 transmitting one or more indications to enable the health monitoring logic 400 in multiple configurations associated with a second mode of operation (e.g., a host-initiated test mode operation). In some cases, the host device 105 may transmit a sequence of such write command, where each mode register value may correspond to a different configuration of the health monitoring logic 400. Alternatively, a host device 105 may transmit a single indication, which may instruct the memory device 110 to sweep (e.g., cycle) through the multiple configurations of the health monitoring logic 400.

In some examples, an output of the health monitoring logic 400 in the described modes may be based at least in part on another register of a memory device 110 that includes the health monitoring logic 400. Such a register may be associated with a single bit field, which may indicate whether any of the coupled internal monitors 410 has satisfied a threshold level of degradation. For example, such a configuration may be supported by a mode register MR123, where a value of MR123 OP[0] may provide such an indication.

In a test mode, the memory device 110 may enable the health monitoring logic to sweep through multiple configurations of coupling internal monitors 410 with the aggregation component 430 and provide a corresponding indication via output 435. In some examples, such techniques may include sweeping through different threshold levels of degradation (e.g., sweeping through values of MR122 OP[2:0]), which may perform further insight into which aspects of health monitoring are indicating a satisfied criteria. In each configuration, the memory device 110 may selectively activate the switching components 420 to generate an output 435 that corresponds to a specific internal monitor 410 in accordance with a specific level of degradation. For example, in a first configuration, the memory device 110 may activate the switching component 420-a while deactivating the switching components 420-b through 420-e, and a first indication of the output 435 may be based on an indication of the internal monitor 410-a (e.g., corresponding to a configured level of degradation). The host device 105 may be aware that the first indication corresponds to the internal monitor 410-a at the configured level of degradation based on a transmitted instruction, or based on reading the associated configuration register (e.g., MR122 OP[7:0]). Additional configurations may be implemented for evaluating an indication corresponding to one or more of the remaining internal monitors 410-b through 410-e.

In some examples, a host device 105 may evaluate the health monitoring logic 400 (e.g., a condition of the health monitoring logic 400) and the memory device 110 based on the indications received during such a test mode. In some cases, the host device 105 may determine that the health monitoring logic is functioning properly based on the indications received during a test mode. In other cases, the host device 105 may determine a fault in the health monitoring logic 400 if two or more indications are equivalent (e.g., indications corresponding to different levels of degradation). The host device 105 may also determine a fault in the health monitoring circuitry if an indication associated with a greater level of degradation (e.g., later-in-life degradation, greater percentage of degradation) indicates a fault while an indication associated with a lower level of degradation does not indicate a fault, or if no indication is equivalent to the expected output (e.g., in accordance with the first mode of operation). In such cases, the host device 105 may transmit a status (e.g., end-of-life status, degradation status) for a user to consider replacing the memory device 110.

Figure 5:
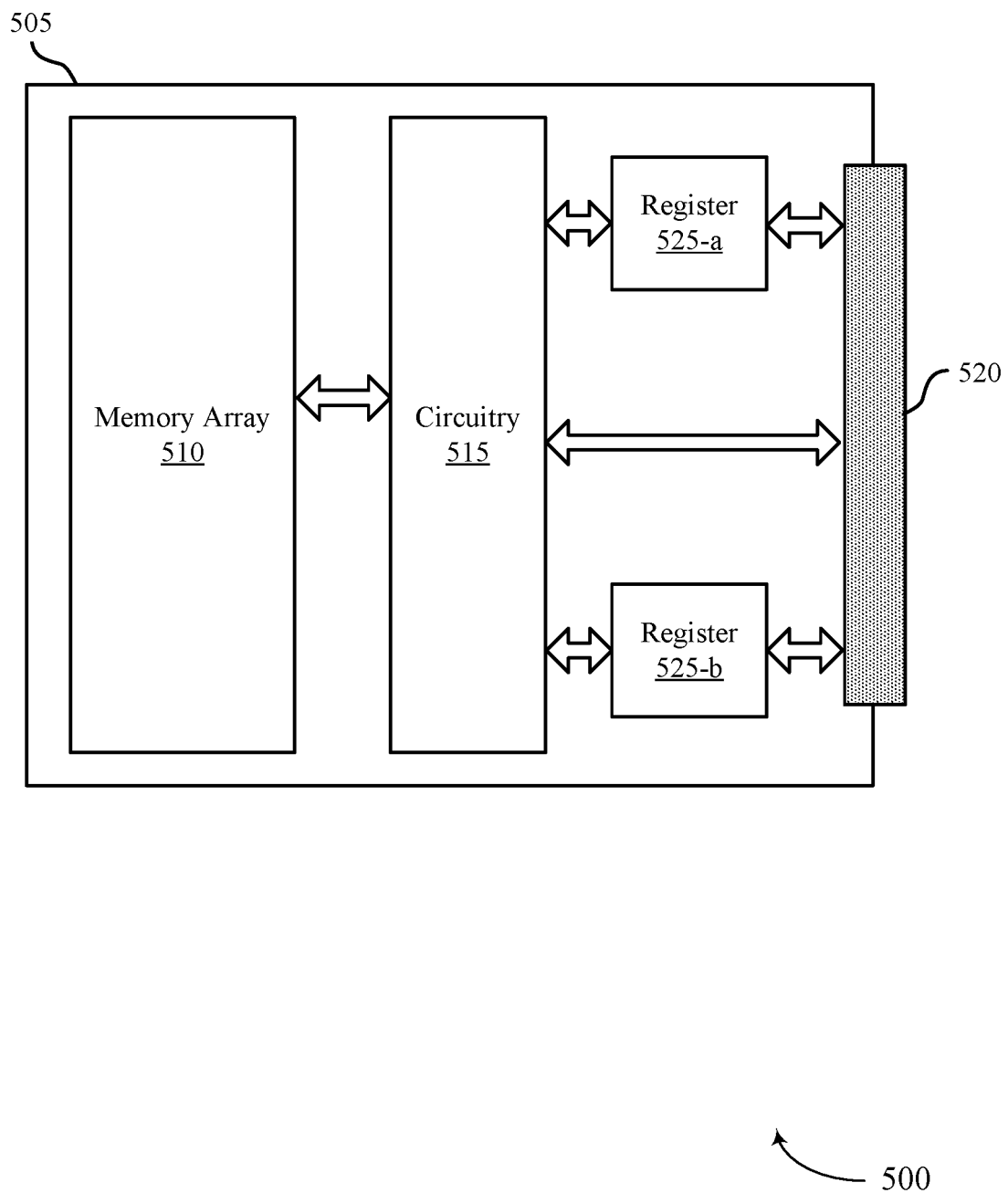
FIG. 5 illustrates an example of a process flow that supports evaluation of memory device health monitoring logic in accordance with examples as disclosed herein.

FIG. 5 illustrates an example of a memory device architecture 500 that supports evaluation of memory device health monitoring logic in accordance with examples as disclosed herein. The memory device architecture 500 may include a memory device 505, which may be an example of aspects of a memory device 110 as described with reference to FIG. 1 or a memory die 200 as described with reference to FIG. 2.

The memory device 505 may include a memory array 510, which may be an example of aspects of a memory array 170 as described with reference to FIG. 1, or an array of memory cells 205 as described with reference to FIG. 2. The memory array 510 may include a collection (e.g., one or more grids, one or more banks, one or more tiles, one or more sections) of memory cells, with each memory cell being operable to store at least one bit of data.

The memory device 505 may also include circuitry 515 coupled with the memory array 510. In some examples, the circuitry 515 may include components for operating (e.g., accessing) the memory array 510. The circuitry 515 may be an example of aspects of a device memory controller 155 or a local memory controller 165 as described with reference to FIG. 1, or a local memory controller 260 as described with reference to FIG. 2. For example, the circuitry 515 may be operable to access one or more memory cells in response to a command received from a source external to the memory device 505, such as a host device 105 (not shown) coupled with the memory device 505. In some examples, the circuitry 515 may include components of a row decoder 220, a column decoder 225, a sense component 245, an input/output 255, among other components or combinations of components.

The memory device 505 may also include one or more pins 520 (e.g., communication pins, CA pins, DQ pins, contacts), which may be coupled with the circuitry 515. For example, the pins 520 may support the circuitry 515 exchanging data with a host device 105 or other source external to the memory device 505. The pins 520 may include an electrically conductive material (e.g., a conductive interface) that may be associated with channels 115 as described with reference to FIG. 1, including data channels 190 and CA channels 186, among other examples.

The memory device 505 may also include one or more registers 525 (e.g., a register 525-a, a register 525-b, a programmable register, a mode register, a configuration register, an adaptive flag register, a readout register), which may be written to or read from by the memory device 505, or a device external to the memory device 505 (e.g., by a host device 105), or a combination thereof. The registers 525 may be coupled with the pins 520, which may support the registers being accessed by (e.g., written to, read from) a host device 105. Additionally, or alternatively, the registers 525 may be coupled with the circuitry 515, which may support the registers being accessed by the circuitry 515 (e.g., by health monitoring logic of the circuitry 515). In some examples, the one or more registers 525 may serve as access points for monitoring a status or information associated with a health of the memory device 505 and may be enabled or disabled on a device basis.

The circuitry 515 may include health monitoring logic for monitoring a degradation level of one or more components of the memory array 510 or of other portions of the circuitry 515. For example, such health monitoring logic may include circuitry configured to monitor one or more metrics associated with a degradation profile (e.g., as described with reference to the degradation diagram 300) such as a wear level of a component (e.g., a resistor, a capacitor, a transistor, a diode, an oscillator, a driver, a latch, a register) of the memory device 505, a temperature of a component of the memory device 505, an operating frequency of a component of the memory device 505, among other metrics. In various examples, such monitoring may be performed on circuit components that support (e.g., directly support, are used during) the operation of the memory array 510 (e.g., circuit components that support access operations), or on components that do not support the operation of the memory array 510 (e.g., surrogate components, circuit components that mimic or approximate a degradation level of circuit components that support access operations), or any combination thereof.

In some examples, health monitoring logic of the circuitry 515 may monitor one or more degradation metrics, one or more components, or one or more degradation levels, or any combination thereof in accordance with a configuration (e.g., a reporting configuration, a monitoring configuration) received via a register 525 (e.g., the register 525-*a*) or in accordance with a default (e.g., predefined, as-built) configuration. For example, the memory device 505 may be configured with a set of one or more indexed degradation levels for the memory device 505, and a host device 105 may indicate a respective index to the memory device 505 via the register 525-*a* (e.g., as a mode register MR122 OP[2:0]). Additionally, or alternatively, the memory device 505 may be configured with a set of multiple internal monitors 410, and a host device 105 may activate one or more of the multiple internal monitors 410 via the register 525-*a* (e.g., as a mode register MR122 OP[7:3]). Thus, a host device 105 may dynamically indicate a configuration of the health monitoring logic in accordance with a degradation level, with activating a set of one or more internal monitors 410, or a combination thereof.

The circuitry 515 may be configured to monitor (e.g., read a value from) the register 525-*a*. For example, after a host device 105 writes a value to the register 525-*a* (e.g., indicative of a corresponding set of activated internal monitors and a degradation level), the circuitry 515 may read a value of the register 525-*a* and identify one or more indexes that corresponds to the value to establish a configuration for health monitoring logic of the circuitry 515. The circuitry 515 may determine a degradation level, or a set of internal monitors 410 to activate (e.g., for determining an output 435), or both in accordance with the one or mode indexes. Health monitoring logic of the circuitry 515 may be enabled to monitor one or more metrics of the memory array 510 in accordance with the indicated degradation level or internal monitors 410. Based on identifying the configuration indicated via the register 525-*a*, the circuitry 515 may also be operable to read data or access health monitoring information stored in the memory array 510, to access health monitoring information written to another register 525 (e.g., written to the register 525-*b*, as a mode register MR123 OP[0]), or both. In some examples, the circuitry 515 may determine whether a metric of the memory device 505 satisfies the degradation level based on accessing the health monitoring information.

The circuitry 515 or the register 525-*b* may be operable to send an indication to a host device 105 if one or more internal monitors of the memory device 505 satisfies an indicated degradation level. For example, the circuitry 515 may write a value to the register 525-*b* (e.g., a bit of a mode register) to indicate that the degradation level is satisfied, which may include setting a bit high (e.g., to a value of '1') to indicate that the degradation level is satisfied. A host device 105 may read the register 525-*b*, which may indicate to the host device 105 whether the indicated degradation level has been satisfied. For example, the host device 105 may poll (e.g., read from, monitor) the register 525-*b* periodically (e.g., at set time intervals), or in response to an indication from the memory device 505, among other initiating conditions. The host device 105 may read bit value(s) from the register 525-*b*, using a read command (e.g., a mode register read command). For example, the host device 105 may transmit the read command to the memory device 505, and the memory device 505 may read out the value from the register 525-*b* and send the value to the host device 105 in response to the read command.

In some examples, the health monitoring logic of the circuitry 515 may indicate when one or more metrics satisfy a threshold level (e.g., static threshold, associated with one or more degradation levels) by writing a value to the register 525-*b*. In some examples, when a fault is detected, the host device 105 may transmit signaling (e.g., one or more indications to evaluate logic) to the memory device 505 to initiate a test mode. In the test mode, the memory device 505 may enable the circuitry 515 to operate in multiple configurations to write an indication specific to each internal monitor to the register 525-*b*, and the host device 105 may monitor the register 525-*b* to read each indication. As such, the host device 105 may attribute the fault to a specific internal monitor or internal monitors, and may evaluate which metrics satisfy a respective indicated threshold level. Moreover, the host device 105 may evaluate whether the health monitoring logic of the circuitry 515 is functioning properly.

In some examples, a host device 105 may transmit a sequence of indications (e.g., commands, requests, writes to the register 525-*a*) that each correspond to a different configuration of multiple configurations, and the memory device 505 may sweep through the configurations of the circuitry 515 in accordance with the sequence of indications. In some other examples, a host device 105 may transmit a single indication to sweep through the multiple configurations of the circuitry 515. In each configuration, the memory device 505 may select an internal monitor of the health monitoring circuitry (e.g., individually) while, in some examples, other monitors may be bypassed or otherwise kept inactive, and the memory device 505 may write an indication specific to the internal monitor to the register 525-*b*. The host device 105 may read the indication from the register 525-*b*. Accordingly, the memory device 505 may write an indication corresponding to each internal monitor of the health monitoring circuitry to the register 525-*b*, and the host device 105 may read each indication.

In these and other examples, the host device 105 may evaluate one or more degradation metrics (e.g., levels of degradation) of the memory device 505, as well as the health monitoring logic of the circuitry 515 itself, by comparing the indications read from the register 525-*b* (e.g., in a test mode). Such comparisons may allow the host device 105 to identify which internal monitor triggered a fault, which may provide greater insight into the status (e.g., degradation status, end-of-life status) of the memory device 505, including whether the health monitoring logic of the circuitry 515 is functioning properly. Thus, various techniques for the evaluation of health monitoring logic of the memory device 505 in accordance with examples as disclosed herein may improve the reliability of the memory device 505.

Figure 6:
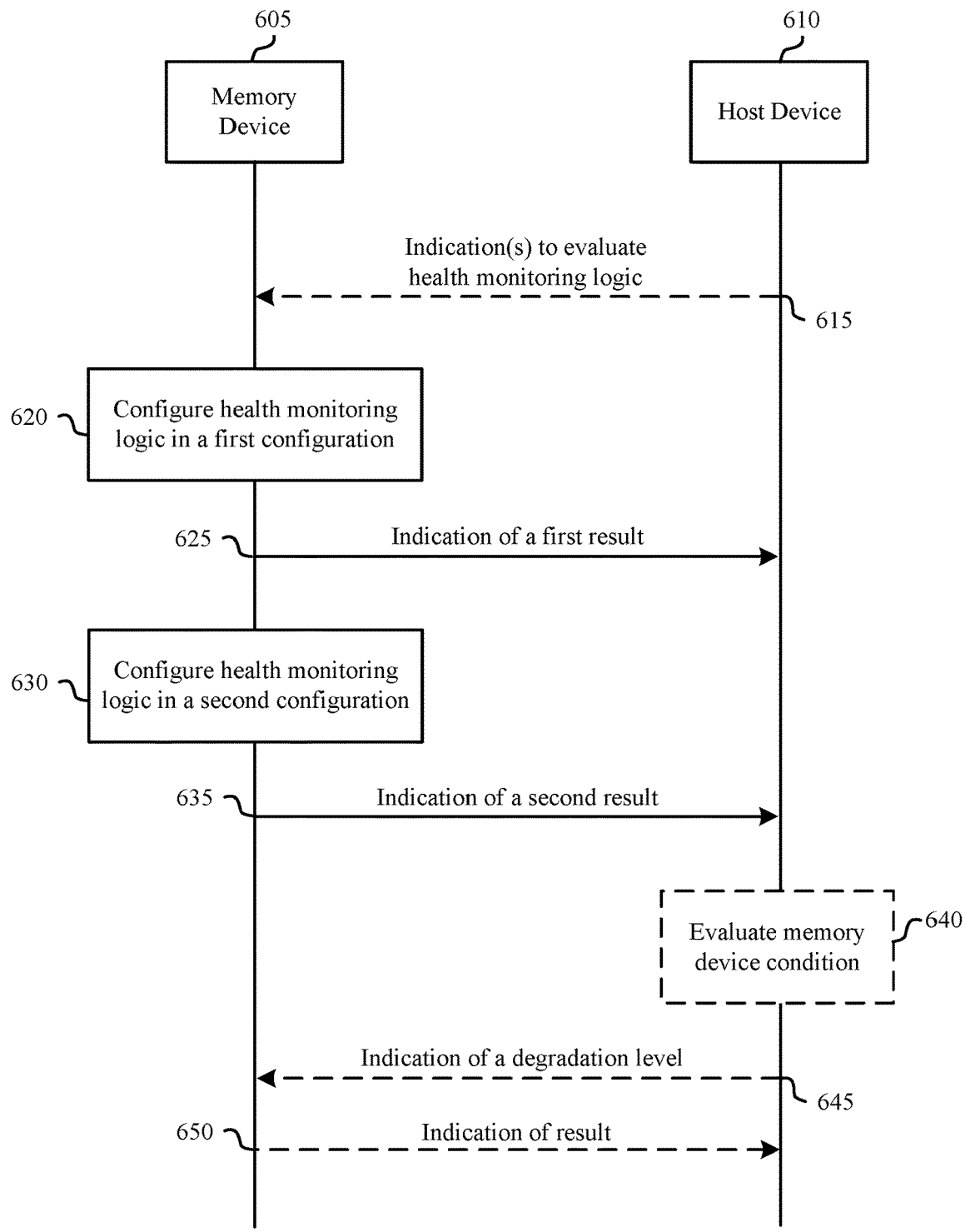
FIG. 6 illustrates an example of a memory architecture that supports evaluation of memory device health monitoring logic in accordance with examples as disclosed herein.

FIG. 6 illustrates an example of a process flow 600 that supports evaluation of memory device health monitoring logic in accordance with examples as disclosed herein. The process flow 600 illustrates operations of and signaling between a memory device 605 and a host device 610. In some examples, the host device 610 and the memory device 605 may represent aspects of a host device and a memory device as described with reference to FIGS. 1-5. For example, the host device 610 may be at least a portion of a vehicle, or a vehicle controller, and the memory device 605 may provide a storage medium for one or more functions of the vehicle or vehicle controller. The process flow 600 may illustrate a process for evaluating health monitoring logic (e.g., of health monitoring logic 400, of circuitry 515) in a test mode, which may include comparisons of multiple outputs of the health monitoring logic as generated in the test mode configuration.

At 615, the host device 610 may, in some examples, transmit one or more indications (e.g., commands, requests, instructions) to evaluate health monitoring logic, which may be received by the memory device 605. The host device 610 may transmit the one or more indications of 615 to instruct the memory device 605 to operate health monitoring logic in multiple configurations (e.g., in accordance with a test mode). The multiple configurations may be associated with certain outputs (e.g., configured outputs, outputs 415), which may support various evaluations by the host device 610. For example, the one or more indications of 615 may include at least an indication of a first internal monitor 410 and a second internal monitor 410, or a first level of degradation and an indication of a second level of degradation, or otherwise indicate configurations associated with different internal monitoring configurations of the memory device 605 (e.g., corresponding to different configurations of the health monitoring logic).

In various examples, the indications of 615 may include a single indication that initiates a sweep of health monitoring configurations by the memory device 605, or the indications of 615 may include multiple indications each corresponding to a respective health monitoring configuration, among other examples. In some examples, to support the indications of 615, the host device 610 may transmit one or more indications (e.g., commands) to write a register of the memory device 605 (e.g., a mode register, a register 525-*a*), which may be received by the memory device 605. In some examples, a value written to such a register may be interpreted by the memory device 605 as an instruction to configure health monitoring logic in accordance with a corresponding health monitoring configuration (e.g., in accordance with a threshold degradation level).

In some examples, the operations of 615 may be omitted and the memory device 605 may otherwise identify a condition associated with a test mode of the memory device 605 (e.g., a power condition, a fault condition, an error condition, an evaluation mode). For example, the test mode may be associated with an initial condition (e.g., an initial operation, an initial powering, a commissioning) of the memory device 605, such that the memory device 605 may identify an initial power on of the memory device 605 (e.g., a first time power is provided to the memory device 605, a first time power is provided to circuitry 515 of the memory device 605), or identifying an initial power on of the memory device 605 while coupled with the host device 610 (e.g., to avoid entering the test mode a first time power is applied while not connected with a host device, such as during a manufacturing evaluation operation or probe test). In some examples, identifying the condition associated with the test mode may be based at least in part on the memory device 605 identifying a duration of operating the memory device 605, such as identifying that a duration of operating the memory device 605 satisfies (e.g., exceeds) a threshold duration, which may be an initial duration of powering or operating the memory device 605 or some other later time (e.g., in accordance with a service or evaluation interval). In some examples, identifying the condition associated with the test mode may be based at least in part on a register (e.g., a mode register, a register 525-*a*) being set to an initial state (e.g., an as-manufactured state), which may prompt the memory device 605 to enter the test mode (e.g., during initial power up or boot operations).

At 620 (e.g., based on an indication of 615, based on the memory device 605 identifying the condition associated with a test mode), the memory device 605 may configure health monitoring logic in a first configuration. The memory device 605 perform the configuring of 620 in response to an indication of 615 that initiates a sweep through multiple configurations of the health monitoring logic (e.g., an indication of 615 that indicates the first configuration among multiple configurations, an indication of multiple internal monitors 410 for respective evaluations, an indication of multiple degradation levels for health monitoring), or in response to an indication of 615 that is dedicated to the first configuration (e.g., an indication of 615 that indicates the first configuration and not another configuration, an indication of a single internal monitor 410 for an evaluation, an indication of a single degradation level for health monitoring). In some examples, the first configuration may correspond to an output of the health monitoring logic (e.g., a known output, a configured output, an output 415), which may be associated with a first internal monitor 410 of the health monitoring logic. In some examples, the configuration of 620 may include configuring the health monitoring logic in accordance with a first level of degradation (e.g., in accordance with evaluating the first level of degradation), which may be associated with enabling an internal monitor corresponding to the first level of degradation or otherwise configuring an internal monitor to evaluate the memory device 605 or one or more components of the memory device 605 in accordance with the first level of degradation.

In response to or as part of the operations of 620, the memory device 605 may generate a first result of the health monitoring logic based on the first configuration. For example, the memory device 605 may generate an indication of whether a health monitoring condition was satisfied in the first configuration, such as an indication of whether a degradation level of the memory device 605 satisfies a first level of degradation associated with the first configuration. In some examples, a generated indication may be stored in a register of the memory device 605 (e.g., in a register 525-*b*), which may be accessible to (e.g., read by) the host device 610.

At 625, the memory device 605 may output the first result of the health monitoring logic, corresponding to the first configuration, which may be received by the host device 610. In some examples, the first result may include an indication of whether a degradation level of the memory device 605 satisfies (e.g., exceeds) a first level of degradation, or whether an evaluation of internal monitoring in the first configuration otherwise satisfied a threshold. In some examples, to support the indication of 625, the host device 610 may transmit a command to read a register (e.g., a mode register, a register 525-*b*), which the memory device 605 may respond to by accessing the register and providing the stored indication.

At 630 (e.g., based on an indication of 615, based on the memory device 605 identifying the condition associated with a test mode), the memory device 605 may configure health monitoring logic in a second configuration that is different than the first configuration. In various examples, the memory device 605 may enable the health monitoring logic in the second configuration in response to an indication of 615 (e.g., as received before communicating the indication of the first result at 625) that initiates a sweep through multiple configurations of the health monitoring logic, or in response to an indication of 615 that is dedicated to the enabling in the second configuration (e.g., an indication of a single internal monitor 410 or degradation level for health monitoring, which may be communicated before or after the communicating the indication of the first result at 625). The second configuration also may correspond to an output of the health monitoring logic (e.g., a known output, a configured output, an output 415), which may be associated with a second internal monitor 410 of the health monitoring logic. In some examples, the configuration of 630 may include configuring the health monitoring logic in accordance with a second level of degradation (e.g., in accordance with evaluating the second level of degradation), which may be associated with enabling an internal monitor corresponding to the second level of degradation or otherwise configuring an internal monitor to evaluate the memory device 605 or one or more components of the memory device 605 in accordance with the second level of degradation.

In response to or as part of the operations of 630, the memory device 605 may generate a second result of the health monitoring logic based on the second configuration. For example, the memory device 605 may generate an indication of whether a health monitoring condition was satisfied in the second configuration, such as an indication of whether a degradation level of the memory device 605 satisfies a second level of degradation associated with the second configuration. In some examples, a generated indication may be stored in a register of the memory device 605 (e.g., in a register 525-*b*), which may be accessible to the host device 610.

At 635, the memory device 605 may output the second result of the health monitoring logic, corresponding to the second configuration, which may be received by the host device 610. In some examples, the second result may include an indication of whether a degradation level of the memory device 605 satisfies (e.g., exceeds) a second level of degradation, or whether an evaluation of internal monitoring in the second configuration otherwise satisfied a threshold. In some examples, to support the indication of 635, the host device 610 may transmit a command to read a register, which the memory device 605 may respond to by accessing the register and providing the stored indication.

Thus, in accordance with the indications of 625 and 635, the memory device 605 may provide separate indications of results of the health monitoring logic in accordance with different configurations of the health monitoring logic. In examples where the first result and the second result would be otherwise aggregated into a single result (e.g., by an aggregation component coupled with multiple internal monitors 410), the indications of 625 may provide more-detailed insight into health monitoring of the memory device 605 by potentially indicating which internal monitor 410 is associated with a given result.

In some examples, the indications of 625 and 635 may support further evaluations or other operations by the memory device 605 and the host device 610. For example, at 640, the host device 610 may evaluate (e.g., infer, ascertain, determine) a condition of the memory device 605 based at least in part on the first result of 625 and the second result of 635. For example, based on the first result of 625 and the second result of 635, the host device 610 may determine that the memory device 605, or health monitoring thereof, is operating as expected (e.g., normally, nominally), or is operating in a manner that indicates a fault (e.g., of the memory device 605, of the health monitoring logic, such as an indication of a fault of one or more internal monitors).

In some examples, an evaluation at 640 may include a comparison between the first result and the second result. For example, under normal operating conditions, the health monitoring logic of the memory device 605 may be expected to output different results in the first configuration and in the second configuration (e.g., for circumstances in which a first threshold of degradation should be satisfied and a second threshold of degradation should not be satisfied). In such examples, if the host device 610 determines that the first result and the second result are different, the host device 610 may proceed with normal operations or, if the host device 610 determines that the first result and the second result are the same, the host device 610 may proceed with corrective operations. In some examples, the first configuration (e.g., associated with a lesser level of degradation) may be expected to have a certain outcome at an earlier stage of operation than the second configuration (e.g., associated with a greater level of degradation). In such examples, if the second configuration indicates the certain outcome (e.g., that a threshold level of degradation has been satisfied) and the first configuration does not, the host device 610 may proceed with corrective operations.

The host device 610 may support various corrective operations based on an evaluation of 640. For example, based on an identification of a fault, the host device 610 may cease operations with the memory device 605, or may use the memory device 605 for lower-priority information or operations, or may operate the memory device 605 in a degraded mode or safe mode, or may perform operations with a different memory device 605 (not shown). In some examples, the host device 610 may provide an indication (e.g., a status indication, to a user), such as an indication that the memory device 605 should be retired or replaced (e.g., a degradation status, an end-of-life status). In some such examples, the host device 610 may respond by signaling an indication (e.g., to a user, to another portion of a system that includes the memory device 605 and host device 610) that the host device 610 has determined the fault of the memory device 605 (e.g., of the health monitoring logic).

The host device 610 also may support various normal operations based on an evaluation of 640. For example, based on an identification of an expected outcome, the host device 610 may perform normal access operations to write to or read from the memory device 605 (e.g., in accordance with normal operations, nominal operations). In some such examples, the host device 610 may proceed with further health monitoring operations of the memory device 605 (e.g., including the operations of 645 and 650, among other operations).

In some examples, at 645 (e.g., based at least in part on determining that the health monitoring logic is operating as expected), the host device 610 may transmit an indication of a degradation level, which may be received by the memory device 605. The indicated degradation level of 645 may be associated with a threshold degradation level for evaluating the memory device 605 using the health monitoring logic. In response, the memory device 605 may configure the health monitoring logic of the memory device 605 (e.g., in an evaluation mode) in accordance with the degradation level indicated at 645. For example, the memory device 605 may evaluate whether a degradation metric associated with one or more components of the memory device 605 satisfies the indicated degradation level.

In some examples, at 650, the memory device 605 may output an indication of a result of the health monitoring logic in accordance with the degradation level. For example, the memory device 605 may output an indication that one or more components of the memory device satisfy the degradation level indicated at 645, of that one or more components of the memory device 605 do not satisfy the degradation level indicated at 645. In some examples, when the memory device 605 indicates that one or more components of the memory device 605 satisfy the degradation level indicated at 645, the operations of 645 and 650 may be repeated for a new degradation level (e.g., a subsequent degradation level), which may support a curve-fitting of a degradation profile by the host device 610.

Although, in some examples, an evaluation of 640 may be performed at the host device 610, in some other examples, such an evaluation may be performed at the memory device 605. For example, the memory device 605 may have an understanding of the expected or relative outputs of the health monitoring logic in the test mode, and the memory device 605 may compare the first result and the second result generated by the health monitoring logic in the test mode. In cases where there is a difference between the first result and the second result, the memory device 605 may indicate to the host device 610 that the health monitoring logic is operating as expected (e.g., nominally, normally). In cases where the first result and the second result are the same, the memory device 605 may indicate to the host device 610 that the health monitoring logic is not operating as expected (e.g., has failed, is operating abnormally). Based on such indications from the memory device 605, the host device 610 may proceed with normal operations or corrective operations, such as those described herein.

Thus, in accordance with examples disclosed herein, a memory device 605 and a host device 610 may support evaluations using multiple configurations of health monitoring logic of the memory device 605 (e.g., in accordance with different sets of one or more activated internal monitors 410, in accordance with multiple degradation levels), which may support an improved insight of the degradation of the memory device 605 (e.g., whether the memory device 605, or component thereof, is degrading in accordance with a decelerating degradation profile or an accelerating degradation profile). Moreover, by implementing an evaluation of the health monitoring logic itself (e.g., by comparing outputs generated in accordance with multiple configurations), the memory device 605 and the host device 610 may support a greater reliability for providing such an understanding of an operable life of the memory device 605, which may further improve operational reliability.

Figure 7:
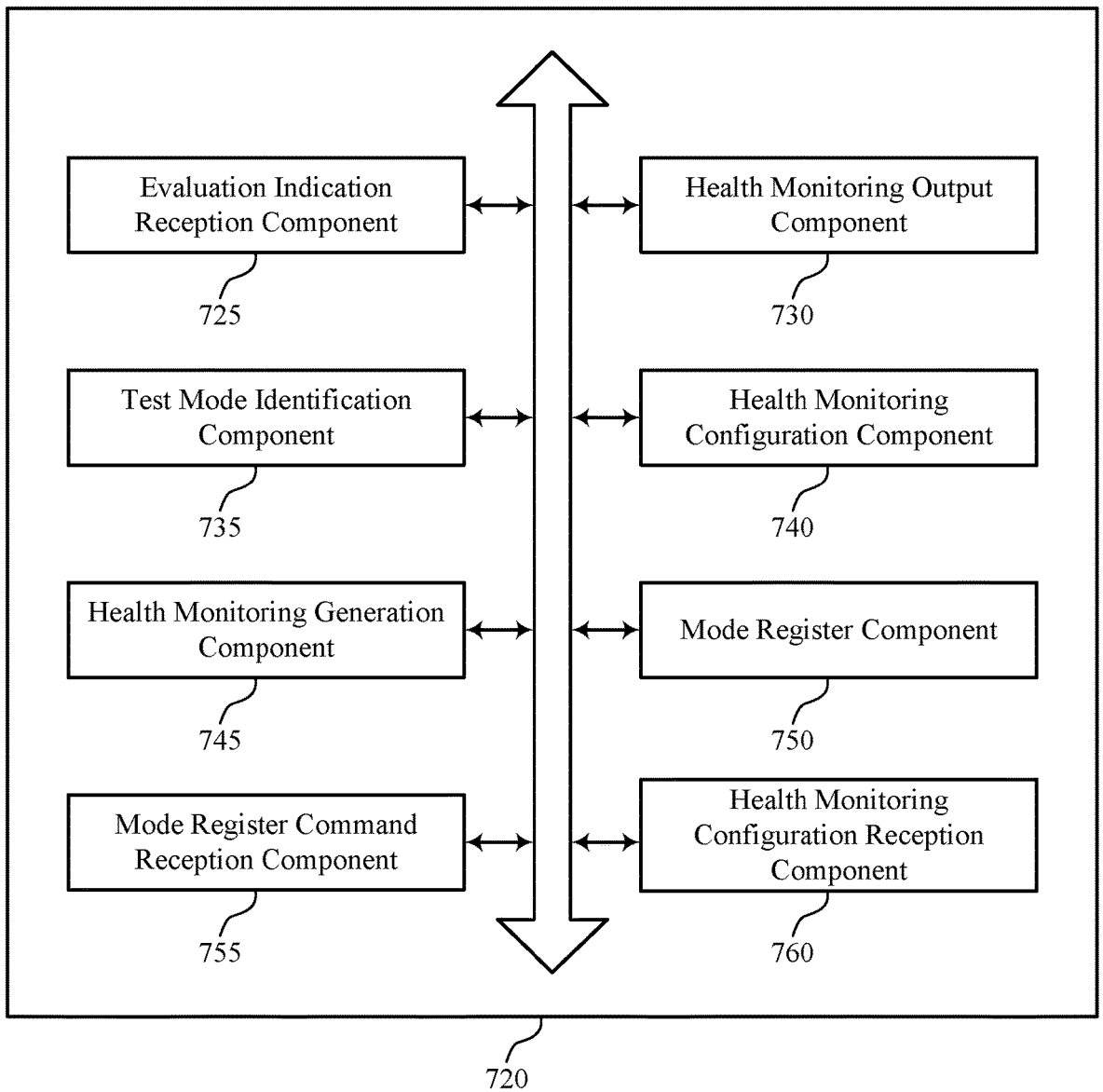
FIG. 7 shows a block diagram of a memory device that supports evaluation of memory device health monitoring logic in accordance with examples as disclosed herein.

FIG. 7 shows a block diagram 700 of a memory device 720 that supports evaluation of memory device health monitoring logic in accordance with examples as disclosed herein. The memory device 720 may be an example of aspects of a memory device as described with reference to FIGS. 1 through 6. The memory device 720, or various components thereof, may be an example of means for performing various aspects of evaluation of memory device health monitoring logic as described herein. For example, the memory device 720 may include an evaluation indication reception component 725, a health monitoring output component 730, a test mode identification component 735, a health monitoring configuration component 740, a health monitoring generation component 745, a mode register component 750, a mode register command reception component 755, a health monitoring configuration reception component 760, or any combination thereof. Each of these components may communicate, directly or indirectly, with one another (e.g., via one or more buses).

The evaluation indication reception component 725 may be configured as or otherwise support a means for receiving one or more indications to evaluate logic for health monitoring of the memory device 720. The health monitoring output component 730 may be configured as or otherwise support a means for outputting, based at least in part on the one or more indications to evaluate the logic for health monitoring, an indication of a first result of the logic for health monitoring in a first configuration of the logic for health monitoring. In some examples, the health monitoring output component 730 may be configured as or otherwise support a means for outputting, based at least in part on the one or more indications to evaluate the logic for health monitoring, an indication of a second result of the logic for health monitoring in a second configuration of the logic for health monitoring.

In some examples, the health monitoring configuration component 740 may be configured as or otherwise support a means for configuring the logic for health monitoring in the first configuration based at least in part on receiving the one or more indications to evaluate the logic for health monitoring. In some examples, the health monitoring generation component 745 may be configured as or otherwise support a means for generating the first result based at least in part on configuring the logic for health monitoring in the first configuration. In some examples, the health monitoring configuration component 740 may be configured as or otherwise support a means for configuring the logic for health monitoring in the second configuration based at least in part on receiving the one or more indications to evaluate the logic for health monitoring. In some examples, the health monitoring generation component 745 may be configured as or otherwise support a means for generating the second result based at least in part on configuring the logic for health monitoring in the second configuration.

In some examples, configuring the logic for health monitoring in the first configuration may be based at least in part on configuring the logic for health monitoring in accordance with a first output value of the logic for health monitoring. In some examples, configuring the logic for health monitoring in the second configuration may be based at least in part on configuring the logic for health monitoring in accordance with a second output value of the logic for health monitoring.

In some examples, configuring the logic for health monitoring in the first configuration may be based at least in part on configuring the logic for health monitoring in accordance with a first level of degradation. In some examples, configuring the logic for health monitoring in the second configuration may be based at least in part on configuring the logic for health monitoring in accordance with a second level of degradation.

In some examples, the one or more indications may include an indication of the first level of degradation and an indication of the second level of degradation.

In some examples, the indication of the first result may include an indication of whether a degradation level of the memory device satisfies the first level of degradation, and the indication of the second result may include an indication of whether the degradation level of the memory device satisfies the second level of degradation.

In some examples, configuring the logic for health monitoring in the first configuration may be based at least in part on receiving an indication of the one or more indications. In some examples, configuring the logic for health monitoring in the second configuration may be based at least in part on receiving the indication of the one or more indications.

In some examples, configuring the logic for health monitoring in the first configuration may be based at least in part on receiving a first indication of the one or more indications. In some examples, configuring the logic for health monitoring in the second configuration may be based at least in part on receiving a second indication of the one or more indications.

In some examples, the mode register component 750 may be configured as or otherwise support a means for writing the indication of the first result to a mode register based at least in part on configuring the logic for health monitoring in the first configuration. In some examples, the health monitoring output component 730 may be configured as or otherwise support a means for outputting the indication of the first result from the mode register. In some examples, the mode register component 750 may be configured as or otherwise support a means for writing the indication of the second result to a mode register based at least in part on configuring the logic for health monitoring in the second configuration. In some examples, the health monitoring output component 730 may be configured as or otherwise support a means for outputting the indication of the second result from the mode register.

In some examples, the mode register command reception component 755 may be configured as or otherwise support a means for receiving a first command to read the mode register, and outputting the indication of the first result from the mode register may be based at least in part on the first command. In some examples, the mode register command reception component 755 may be configured as or otherwise support a means for receiving a second command to read the mode register, and outputting the indication of the second result from the mode register may be based at least in part on the second command.

In some examples, the mode register command reception component 755 may be configured as or otherwise support a means for receiving one or more commands to write a mode register of the memory device, and receiving the one or more indications to evaluate the logic for health monitoring may be based at least in part on reading the mode register.

In some examples, the test mode identification component 735 may be configured as or otherwise support a means for identifying a condition associated with a test mode of the memory device 720. In some examples, the health monitoring configuration component 740 may be configured as or otherwise support a means for configuring, based at least in part on identifying the condition associated with the test mode, logic for health monitoring of the memory device 720 in accordance with evaluating a first level of degradation. In some examples, the health monitoring output component 730 may be configured as or otherwise support a means for outputting, based at least in part on configuring the logic for health monitoring in accordance with evaluating the first level of degradation, an indication of a first result of the logic for health monitoring. In some examples, the health monitoring configuration component 740 may be configured as or otherwise support a means for configuring, based at least in part on identifying the condition associated with the test mode, the logic for health monitoring in accordance with evaluating a second level of degradation. In some examples, the health monitoring output component 730 may be configured as or otherwise support a means for outputting, based at least in part on configuring the logic for health monitoring in accordance with evaluating the second level of degradation, an indication of a second result of the logic for health monitoring.

In some examples, the health monitoring configuration reception component 760 may be configured as or otherwise support a means for receiving a first indication of the first level of degradation and a second indication of the second level of degradation, and configuring the logic for health monitoring in accordance with evaluating the first level of degradation may be based at least in part on the first indication and configuring the logic for health monitoring in accordance with evaluating the second level of degradation may be based at least in part on the second indication.

In some examples, the mode register component 750 may be configured as or otherwise support a means for writing the indication of the first result to a mode register. In some examples, the health monitoring output component 730 may be configured as or otherwise support a means for outputting the indication of the first result from the mode register. In some examples, the mode register component 750 may be configured as or otherwise support a means for writing the indication of the second result to a mode register. In some examples, the health monitoring output component 730 may be configured as or otherwise support a means for outputting the indication of the second result from the mode register.

In some examples, the mode register command reception component 755 may be configured as or otherwise support a means for receiving a first command to read the mode register, and outputting the indication of the first result from the mode register may be based at least in part on the first command. In some examples, the mode register command reception component 755 may be configured as or otherwise support a means for receiving a second command to read the mode register, and outputting the indication of the second result from the mode register may be based at least in part on the second command.

Figure 8:
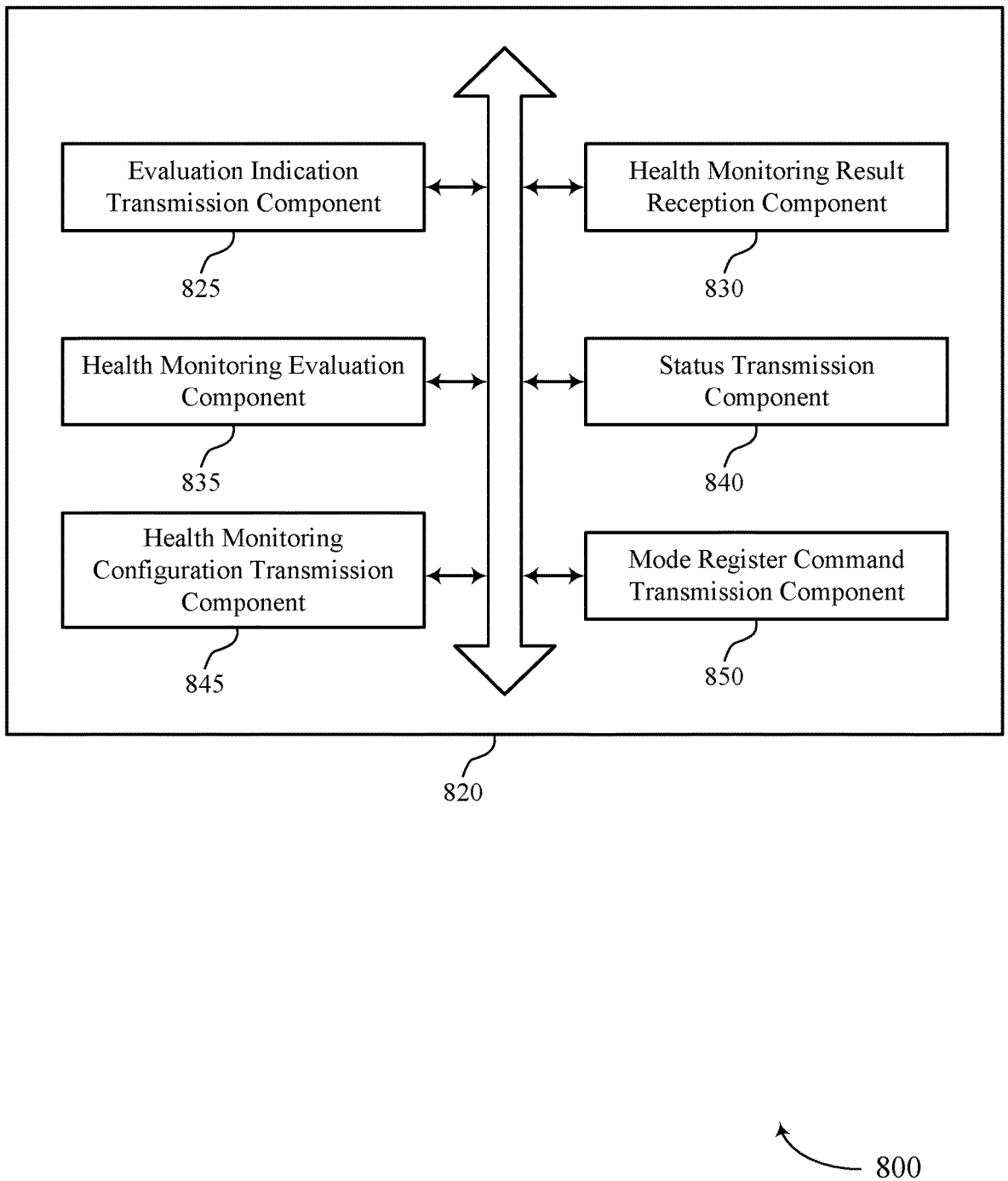
FIG. 8 shows a block diagram of a host device that supports evaluation of memory device health monitoring logic in accordance with examples as disclosed herein.

FIG. 8 shows a block diagram 800 of a host device 820 that supports evaluation of memory device health monitoring logic in accordance with examples as disclosed herein. The host device 820 may be an example of aspects of a host device as described with reference to FIGS. 1 through 5. The host device 820, or various components thereof, may be an example of means for performing various aspects of evaluation of memory device health monitoring logic as described herein. For example, the host device 820 may include an evaluation indication transmission component 825, a health monitoring result reception component 830, a health monitoring evaluation component 835, a status transmission component 840, a health monitoring configuration transmission component 845, a mode register command transmission component 850, or any combination thereof. Each of these components may communicate, directly or indirectly, with one another (e.g., via one or more buses).

The evaluation indication transmission component 825 may be configured as or otherwise support a means for transmitting one or more indications to evaluate logic for health monitoring of a memory device. The health monitoring result reception component 830 may be configured as or otherwise support a means for receiving, based at least in part on transmitting the one or more indications to evaluate the logic for health monitoring, a first indication of a first result of the logic for health monitoring in a first configuration and a second indication of a second result of the logic for health monitoring in a second configuration. The health monitoring evaluation component 835 may be configured as or otherwise support a means for evaluating a condition of the memory device based at least in part on comparing the first result with the second result.

In some examples, the status transmission component 840 may be configured as or otherwise support a means for transmitting an indication of a status of the memory device based at least in part on the first result being the same as the second result.

In some examples, the health monitoring configuration transmission component 845 may be configured as or otherwise support a means for transmitting, based at least in part on the first result being different than the second result, an indication of a degradation level for evaluating the memory device using the logic for health monitoring. In some examples, the health monitoring configuration transmission component 845 may be configured as or otherwise support a means for receiving, based at least in part on transmitting the indication of the degradation level, an indication of whether the memory device satisfies the degradation level.

In some examples, the first configuration may be associated with a first level of degradation for the logic for health monitoring and the second configuration may be associated with a second level of degradation for the logic for health monitoring.

In some examples, the one or more indications may include an indication of the first level of degradation and an indication of the second level of degradation.

In some examples, the one or more indications to evaluate the logic for health monitoring include a single indication to evaluate the logic for health monitoring in the first configuration and in the second configuration. In some examples, the one or more indications to evaluate the logic for health monitoring may include a first indication to evaluate the logic for health monitoring in the first configuration and a second indication to evaluate the logic for health monitoring in the second configuration.

In some examples, the mode register command transmission component 850 may be configured as or otherwise support a means for transmitting one or more commands to read a mode register of the memory device, and receiving the first indication of the first result and receiving the second indication of the second result may be based at least in part on transmitting the one or more commands to read the mode register.

In some examples, the mode register command transmission component 850 may be configured as or otherwise support a means for transmitting one or more commands to write a mode register of the memory device, and transmitting the one or more indications to evaluate the logic for health monitoring may be based at least in part on transmitting the one or more commands to write the mode register.

Figure 9:
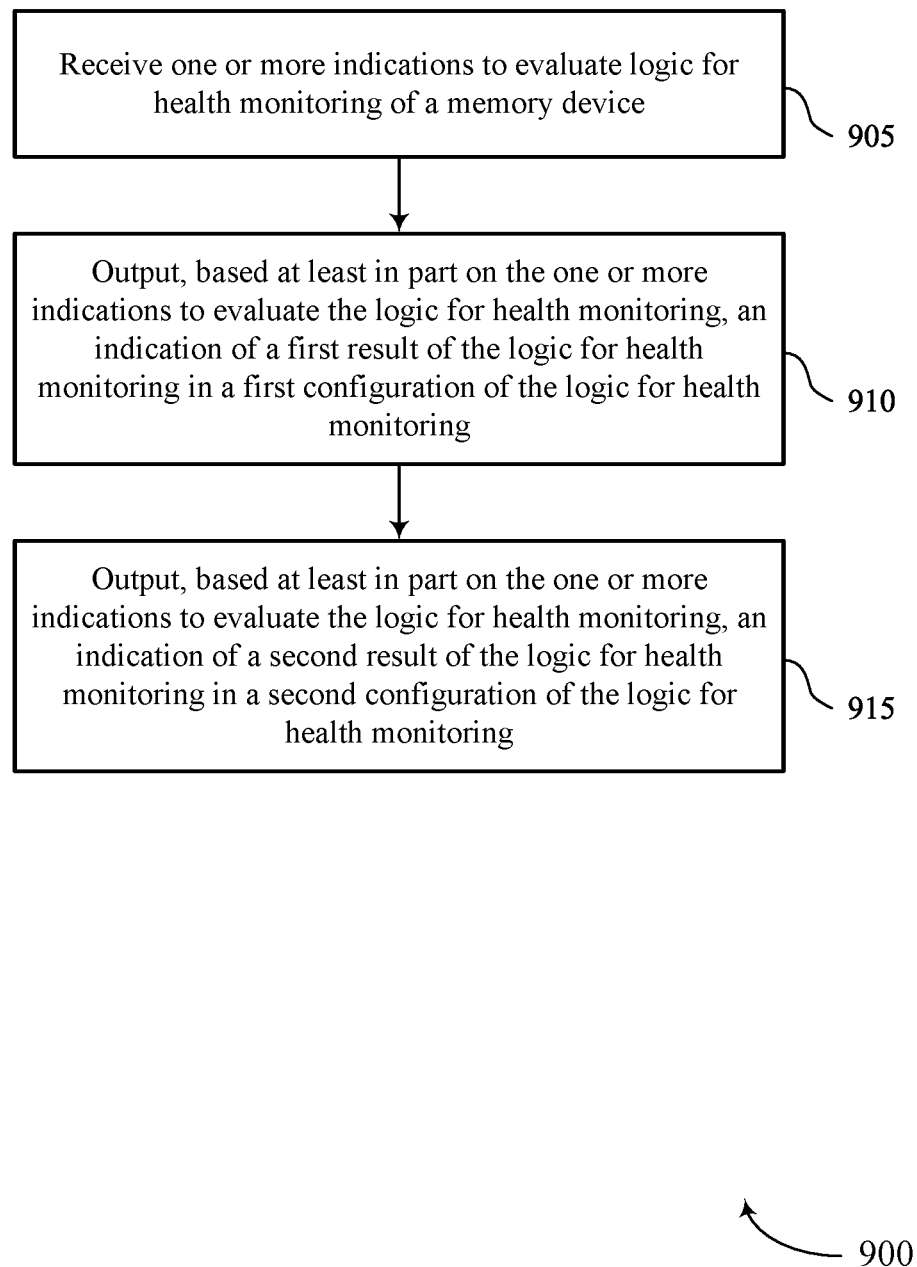
FIGS. 9 through 11 show flowcharts illustrating a method or methods that support evaluation of memory device health monitoring logic in accordance with examples as disclosed herein.

FIG. 9 shows a flowchart illustrating a method 900 that supports evaluation of memory device health monitoring logic in accordance with examples as disclosed herein. The operations of method 900 may be implemented by a memory device or its components as described herein. For example, the operations of method 900 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 905, the method may include receiving (e.g., at a memory device) one or more indications to evaluate logic for health monitoring of a memory device. The operations of 905 may be performed in accordance with examples as disclosed with reference to FIGS. 3 through 6. In some examples, aspects of the operations of 905 may be performed by an evaluation indication reception component 725 as described with reference to FIG. 7.

At 910, the method may include outputting, based at least in part on the one or more indications to evaluate the logic for health monitoring, an indication of a first result of the logic for health monitoring in a first configuration of the logic for health monitoring. The operations of 910 may be performed in accordance with examples as disclosed with reference to FIGS. 3 through 6. In some examples, aspects of the operations of 910 may be performed by a health monitoring output component 730 as described with reference to FIG. 7.

At 915, the method may include outputting, based at least in part on the one or more indications to evaluate the logic for health monitoring, an indication of a second result of the logic for health monitoring in a second configuration of the logic for health monitoring. The operations of 915 may be performed in accordance with examples as disclosed with reference to FIGS. 3 through 6. In some examples, aspects of the operations of 915 may be performed by a health monitoring output component 730 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving (e.g., at a memory device) one or more indications to evaluate logic for health monitoring of a memory device; outputting, based at least in part on the one or more indications to evaluate the logic for health monitoring, an indication of a first result of the logic for health monitoring in a first configuration of the logic for health monitoring; and outputting, based at least in part on the one or more indications to evaluate the logic for health monitoring, an indication of a second result of the logic for health monitoring in a second configuration of the logic for health monitoring.

Aspect 2: The method, apparatus, or non-transitory computer-readable medium of aspect 1, further including operations, features, circuitry, logic, means, or instructions, or any combination thereof for configuring the logic for health monitoring in the first configuration based at least in part on receiving the one or more indications to evaluate the logic for health monitoring; generating the first result based at least in part on configuring the logic for health monitoring in the first configuration; configuring the logic for health monitoring in the second configuration based at least in part on receiving the one or more indications to evaluate the logic for health monitoring; and generating the second result based at least in part on configuring the logic for health monitoring in the second configuration.

Aspect 3: The method, apparatus, or non-transitory computer-readable medium of aspect 2 where configuring the logic for health monitoring in the first configuration is based at least in part on configuring the logic for health monitoring in accordance with a first output value of the logic for health monitoring and configuring the logic for health monitoring in the second configuration is based at least in part on configuring the logic for health monitoring in accordance with a second output value of the logic for health monitoring.

Aspect 4: The method, apparatus, or non-transitory computer-readable medium of any of aspects 2 through 3 where configuring the logic for health monitoring in the first configuration is based at least in part on configuring the logic for health monitoring in accordance with a first level of degradation and configuring the logic for health monitoring in the second configuration is based at least in part on configuring the logic for health monitoring in accordance with a second level of degradation.

Aspect 5: The method, apparatus, or non-transitory computer-readable medium of aspect 4 where the one or more indications include an indication of the first level of degradation and an indication of the second level of degradation.

Aspect 6: The method, apparatus, or non-transitory computer-readable medium of any of aspects 4 through 5 where the indication of the first result includes an indication of whether a degradation level of the memory device satisfies the first level of degradation and the indication of the second result includes an indication of whether the degradation level of the memory device satisfies the second level of degradation.

Aspect 7: The method, apparatus, or non-transitory computer-readable medium of any of aspects 2 through 6 where configuring the logic for health monitoring in the first configuration is based at least in part on receiving an indication of the one or more indications and configuring the logic for health monitoring in the second configuration is based at least in part on receiving the indication of the one or more indications.

Aspect 8: The method, apparatus, or non-transitory computer-readable medium of any of aspects 2 through 6 where configuring the logic for health monitoring in the first configuration is based at least in part on receiving a first indication of the one or more indications and configuring the logic for health monitoring in the second configuration is based at least in part on receiving a second indication of the one or more indications.

Aspect 9: The method, apparatus, or non-transitory computer-readable medium of any of aspects 1 through 8, further including operations, features, circuitry, logic, means, or instructions, or any combination thereof for writing the indication of the first result to a mode register based at least in part on configuring the logic for health monitoring in the first configuration; outputting the indication of the first result from the mode register; writing the indication of the second result to a mode register based at least in part on configuring the logic for health monitoring in the second configuration; and outputting the indication of the second result from the mode register.

Aspect 10: The method, apparatus, or non-transitory computer-readable medium of aspect 9, further including operations, features, circuitry, logic, means, or instructions, or any combination thereof for receiving a first command to read the mode register, where outputting the indication of the first result from the mode register is based at least in part on the first command and receiving a second command to read the mode register, where outputting the indication of the second result from the mode register is based at least in part on the second command.

Aspect 11: The method, apparatus, or non-transitory computer-readable medium of any of aspects 1 through 10, further including operations, features, circuitry, logic, means, or instructions, or any combination thereof for receiving one or more commands to write a mode register of the memory device, where receiving the one or more indications to evaluate the logic for health monitoring is based at least in part on reading the mode register.

Figure 10:
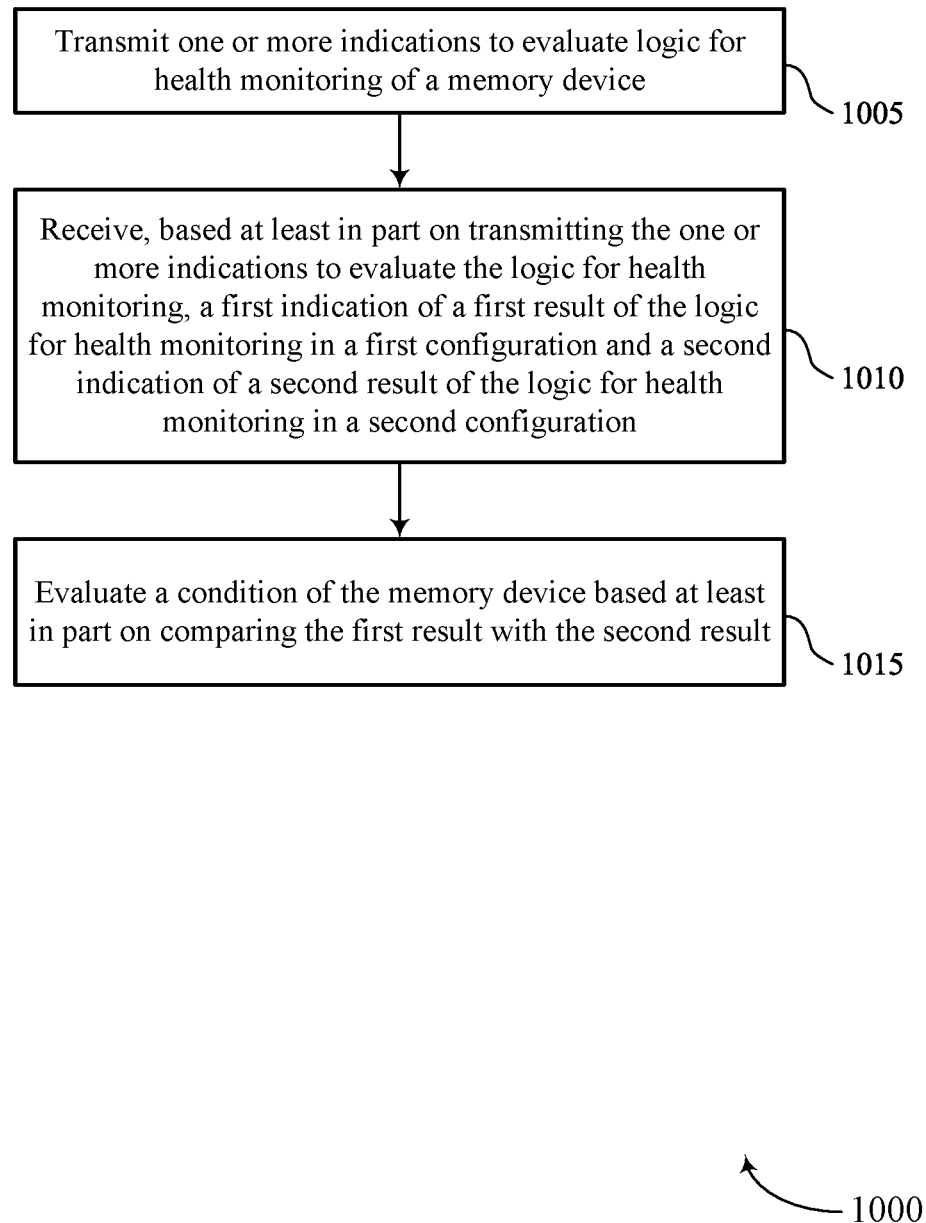

FIG. 10 shows a flowchart illustrating a method 1000 that supports evaluation of memory device health monitoring logic in accordance with examples as disclosed herein. The operations of method 1000 may be implemented by a host device or its components as described herein. For example, the operations of method 1000 may be performed by a host device as described with reference to FIGS. 1 through 5 and 8. In some examples, a host device may execute a set of instructions to control the functional elements of the device to perform the described functions. Additionally, or alternatively, the host device may perform aspects of the described functions using special-purpose hardware.

At 1005, the method may include transmitting (e.g., by a host device) one or more indications to evaluate logic for health monitoring of a memory device. The operations of 1005 may be performed in accordance with examples as disclosed with reference to FIGS. 3 through 6. In some examples, aspects of the operations of 1005 may be performed by an evaluation indication transmission component 825 as described with reference to FIG. 8.

At 1010, the method may include receiving, based at least in part on transmitting the one or more indications to evaluate the logic for health monitoring, a first indication of a first result of the logic for health monitoring in a first configuration and a second indication of a second result of the logic for health monitoring in a second configuration. The operations of 1010 may be performed in accordance with examples as disclosed with reference to FIGS. 3 through 6. In some examples, aspects of the operations of 1010 may be performed by a health monitoring result reception component 830 as described with reference to FIG. 8.

At 1015, the method may include evaluating a condition of the memory device based at least in part on comparing the first result with the second result. The operations of 1015 may be performed in accordance with examples as disclosed with reference to FIGS. 3 through 6. In some examples, aspects of the operations of 1015 may be performed by a health monitoring evaluation component 835 as described with reference to FIG. 8.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for transmitting (e.g., by a host device) one or more indications to evaluate logic for health monitoring of a memory device; receiving, based at least in part on transmitting the one or more indications to evaluate the logic for health monitoring, a first indication of a first result of the logic for health monitoring in a first configuration and a second indication of a second result of the logic for health monitoring in a second configuration; and evaluating a condition of the memory device based at least in part on comparing the first result with the second result.

Aspect 13: The method, apparatus, or non-transitory computer-readable medium of aspect 12, further including operations, features, circuitry, logic, means, or instructions, or any combination thereof for transmitting an indication of a status of the memory device based at least in part on the first result being the same as the second result.

Aspect 14: The method, apparatus, or non-transitory computer-readable medium of any of aspects 12 through 13, further including operations, features, circuitry, logic, means, or instructions, or any combination thereof for transmitting, based at least in part on the first result being different than the second result, an indication of a degradation level for evaluating the memory device using the logic for health monitoring and receiving, based at least in part on transmitting the indication of the degradation level, an indication of whether the memory device satisfies the degradation level.

Aspect 15: The method, apparatus, or non-transitory computer-readable medium of any of aspects 12 through 14 where the first configuration is associated with a first level of degradation for the logic for health monitoring and the second configuration is associated with a second level of degradation for the logic for health monitoring.

Aspect 16: The method, apparatus, or non-transitory computer-readable medium of aspect 15 where the one or more indications include an indication of the first level of degradation and an indication of the second level of degradation.

Aspect 17: The method, apparatus, or non-transitory computer-readable medium of any of aspects 12 through 16 where the one or more indications to evaluate the logic for health monitoring include a single indication to evaluate the logic for health monitoring in the first configuration and in the second configuration.

Aspect 18: The method, apparatus, or non-transitory computer-readable medium of any of aspects 12 through 16 where the one or more indications to evaluate the logic for health monitoring include a first indication to evaluate the logic for health monitoring in the first configuration and a second indication to evaluate the logic for health monitoring in the second configuration.

Aspect 19: The method, apparatus, or non-transitory computer-readable medium of any of aspects 12 through 18, further including operations, features, circuitry, logic, means, or instructions, or any combination thereof for transmitting one or more commands to read a mode register of the memory device, where receiving the first indication of the first result and receiving the second indication of the second result are based at least in part on transmitting the one or more commands to read the mode register.

Aspect 20: The method, apparatus, or non-transitory computer-readable medium of any of aspects 12 through 19, further including operations, features, circuitry, logic, means, or instructions, or any combination thereof for transmitting one or more commands to write a mode register of the memory device, where transmitting the one or more indications to evaluate the logic for health monitoring is based at least in part on transmitting the one or more commands to write the mode register.

Figure 11:
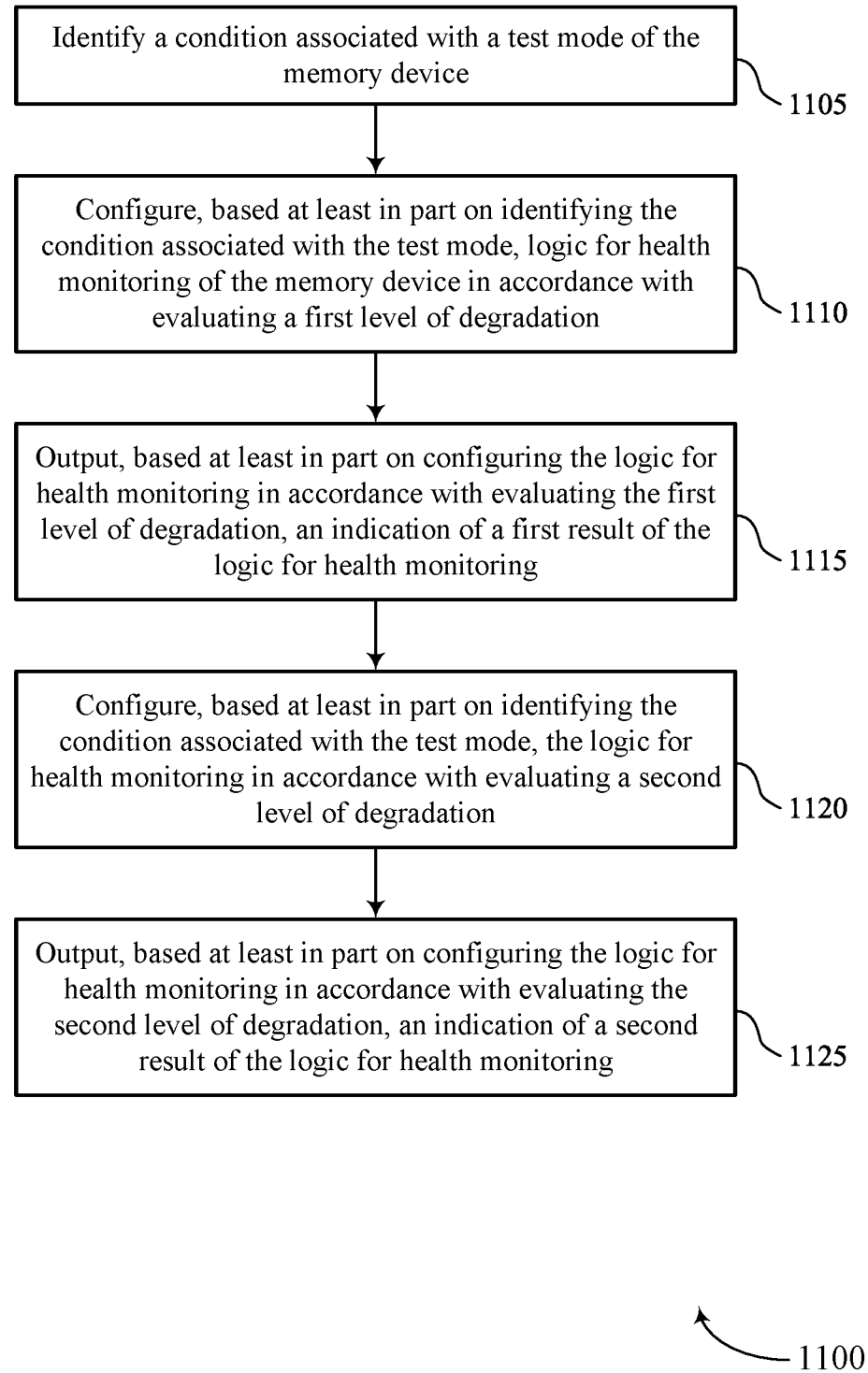

FIG. 11 shows a flowchart illustrating a method 1100 that supports evaluation of memory device health monitoring logic in accordance with examples as disclosed herein. The operations of method 1100 may be implemented by a memory device or its components as described herein. For example, the operations of method 1100 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 1105, the method may include identifying (e.g., at a memory device) a condition associated with a test mode of the memory device. The operations of 1105 may be performed in accordance with examples as disclosed with reference to FIGS. 3 through 6. In some examples, aspects of the operations of 1105 may be performed by a test mode identification component 735 as described with reference to FIG. 7.

At 1110, the method may include configuring, based at least in part on identifying the condition associated with the test mode, logic for health monitoring of the memory device in accordance with evaluating a first level of degradation. The operations of 1110 may be performed in accordance with examples as disclosed with reference to FIGS. 3 through 6. In some examples, aspects of the operations of 1110 may be performed by a health monitoring configuration component 740 as described with reference to FIG. 7.

At 1115, the method may include outputting, based at least in part on configuring the logic for health monitoring in accordance with evaluating the first level of degradation, an indication of a first result of the logic for health monitoring. The operations of 1115 may be performed in accordance with examples as disclosed with reference to FIGS. 3 through 6. In some examples, aspects of the operations of 1115 may be performed by a health monitoring output component 730 as described with reference to FIG. 7.

At 1120, the method may include configuring, based at least in part on identifying the condition associated with the test mode, the logic for health monitoring in accordance with evaluating a second level of degradation. The operations of 1120 may be performed in accordance with examples as disclosed with reference to FIGS. 3 through 6. In some examples, aspects of the operations of 1120 may be performed by a health monitoring configuration component 740 as described with reference to FIG. 7.

At 1125, the method may include outputting, based at least in part on configuring the logic for health monitoring in accordance with evaluating the second level of degradation, an indication of a second result of the logic for health monitoring. The operations of 1125 may be performed in accordance with examples as disclosed with reference to FIGS. 3 through 6. In some examples, aspects of the operations of 1125 may be performed by a health monitoring output component 730 as described with reference to FIG. 7.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 21: A method, apparatus, or non-transitory computer-readable medium including operations, features, circuitry, logic, means, or instructions, or any combination thereof for identifying (e.g., at a memory device) a condition associated with a test mode of the memory device; configuring, based at least in part on identifying the condition associated with the test mode, logic for health monitoring of the memory device in accordance with evaluating a first level of degradation; outputting, based at least in part on configuring the logic for health monitoring in accordance with evaluating the first level of degradation, an indication of a first result of the logic for health monitoring; configuring, based at least in part on identifying the condition associated with the test mode, the logic for health monitoring in accordance with evaluating a second level of degradation; and outputting, based at least in part on configuring the logic for health monitoring in accordance with evaluating the second level of degradation, an indication of a second result of the logic for health monitoring.

Aspect 22: The method, apparatus, or non-transitory computer-readable medium of aspect 21, further including operations, features, circuitry, logic, means, or instructions, or any combination thereof for receiving a first indication of the first level of degradation and a second indication of the second level of degradation, where configuring the logic for health monitoring in accordance with evaluating the first level of degradation is based at least in part on the first indication and configuring the logic for health monitoring in accordance with evaluating the second level of degradation is based at least in part on the second indication.

Aspect 23: The method, apparatus, or non-transitory computer-readable medium of any of aspects 21 through 22, further including operations, features, circuitry, logic, means, or instructions, or any combination thereof for writing the indication of the first result to a mode register; outputting the indication of the first result from the mode register; writing the indication of the second result to a mode register; and outputting the indication of the second result from the mode register.

Aspect 24: The method, apparatus, or non-transitory computer-readable medium of aspect 23, further including operations, features, circuitry, logic, means, or instructions, or any combination thereof for receiving a first command to read the mode register, where outputting the indication of the first result from the mode register is based at least in part on the first command and receiving a second command to read the mode register, where outputting the indication of the second result from the mode register is based at least in part on the second command.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 25: An apparatus, including: a memory array (e.g., of a memory device); and logic (e.g., of the memory device, coupled with the memory array) configured to cause the apparatus to: receive one or more indications to evaluate logic for health monitoring of the apparatus; output, based at least in part on the one or more indications to evaluate the logic for health monitoring, an indication of a first result of the logic for health monitoring in a first configuration of the logic for health monitoring; and output, based at least in part on the one or more indications to evaluate the logic for health monitoring, an indication of a second result of the logic for health monitoring in a second configuration of the logic for health monitoring.

Aspect 26: The apparatus of aspect 25, where the logic is configured to cause the apparatus to: configure the logic for health monitoring in the first configuration based at least in part on receiving the one or more indications to evaluate the logic for health monitoring; generate the first result based at least in part on configuring the logic for health monitoring in the first configuration; configure the logic for health monitoring in the second configuration based at least in part on receiving the one or more indications to evaluate the logic for health monitoring; and generate the second result based at least in part on configuring the logic for health monitoring in the second configuration.

Aspect 27: The apparatus of aspect 26, where the logic is configured to cause the apparatus to: configure the logic for health monitoring in the first configuration based at least in part on configuring the logic for health monitoring in accordance with a first output value of the logic for health monitoring; and configure the logic for health monitoring in the first configuration based at least in part on configuring the logic for health monitoring in accordance with a second output value of the logic for health monitoring.

Aspect 28: The apparatus of any of aspects 26 through 27, where the logic is configured to cause the apparatus to: configure the logic for health monitoring in the first configuration based at least in part on configuring the logic for health monitoring in accordance with a first level of degradation; and configure the logic for health monitoring in the second configuration based at least in part on configuring the logic for health monitoring in accordance with a second level of degradation.

Aspect 29: The apparatus of aspect 28 where the one or more indications include an indication of the first level of degradation and an indication of the second level of degradation.

Aspect 30: The apparatus of any of aspects 28 through 29, where: the indication of the first result includes an indication of whether a degradation level of the apparatus satisfies the first level of degradation; and the indication of the second result includes an indication of whether the degradation level of the apparatus satisfies the second level of degradation.

Another apparatus is described. The following provides an overview of aspects of the apparatus as described herein:

Aspect 31: An apparatus, including: logic operable to couple with a memory device, the logic configured to cause the apparatus to: transmit one or more indications to evaluate logic for health monitoring of a memory device; receive, based at least in part on transmitting the one or more indications to evaluate the logic for health monitoring, a first indication of a first result of the logic for health monitoring in a first configuration and a second indication of a second result of the logic for health monitoring in a second configuration; and evaluate a condition of the memory device based at least in part on comparing the first result with the second result.

Aspect 32: The apparatus of aspect 31, where the logic is configured to cause the apparatus to: transmit an indication of a status of the memory device based at least in part on the first result being the same as the second result.

Aspect 33: The apparatus of any of aspects 31 through 32, where the logic is configured to cause the apparatus to: transmit, based at least in part on the first result being different than the second result, an indication of a degradation level for evaluating the memory device using the logic for health monitoring; and receive, based at least in part on transmitting the indication of the degradation level, an indication of whether the memory device satisfies the degradation level.

Aspect 34: The apparatus of any of aspects 31 through 33, where: the first configuration is associated with a first level of degradation for the logic for health monitoring; and the second configuration is associated with a second level of degradation for the logic for health monitoring.

Aspect 35: The apparatus of aspect 34, where the one or more indications include an indication of the first level of degradation and an indication of the second level of degradation.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving, at a memory device from a host device, one or more indications to evaluate logic for health monitoring of the memory device according to both a first configuration of the logic for health monitoring and a second configuration of the logic for health monitoring;
    outputting, based at least in part on the one or more indications to evaluate the logic for health monitoring, an indication of a first result of the logic for health monitoring according to the first configuration of the logic for health monitoring; and
    outputting, based at least in part on the one or more indications to evaluate the logic for health monitoring, an indication of a second result of the logic for health monitoring according to the second configuration of the logic for health monitoring.

2. The method of claim 1, further comprising:
    configuring the logic for health monitoring according to the first configuration based at least in part on receiving the one or more indications to evaluate the logic for health monitoring;
    generating the first result based at least in part on configuring the logic for health monitoring according to the first configuration;
    configuring the logic for health monitoring according to the second configuration based at least in part on receiving the one or more indications to evaluate the logic for health monitoring; and
    generating the second result based at least in part on configuring the logic for health monitoring according to the second configuration.

3. The method of claim 2, wherein:
    configuring the logic for health monitoring according to the first configuration is based at least in part on configuring the logic for health monitoring in accordance with a first output value of the logic for health monitoring; and
    configuring the logic for health monitoring according to the second configuration is based at least in part on configuring the logic for health monitoring in accordance with a second output value of the logic for health monitoring.

4. The method of claim 2, wherein:
    configuring the logic for health monitoring according to the first configuration is based at least in part on configuring the logic for health monitoring in accordance with a first level of degradation; and
    configuring the logic for health monitoring according to the second configuration is based at least in part on configuring the logic for health monitoring in accordance with a second level of degradation.

5. The method of claim 4, wherein the one or more indications comprise an indication of the first level of degradation and an indication of the second level of degradation.

6. The method of claim 4, wherein:
    the indication of the first result comprises an indication of whether a degradation level of the memory device satisfies the first level of degradation; and
    the indication of the second result comprises an indication of whether the degradation level of the memory device satisfies the second level of degradation.

7. The method of claim 2, wherein:
configuring the logic for health monitoring according to the first configuration is based at least in part on receiving an indication of the one or more indications; and
configuring the logic for health monitoring according to the second configuration is based at least in part on receiving the indication of the one or more indications.

8. The method of claim 2, wherein:
configuring the logic for health monitoring according to the first configuration is based at least in part on receiving a first indication of the one or more indications; and
configuring the logic for health monitoring according to the second configuration is based at least in part on receiving a second indication of the one or more indications.

9. The method of claim 1, further comprising:
writing the indication of the first result to a mode register based at least in part on configuring the logic for health monitoring according to the first configuration;
outputting the indication of the first result from the mode register;
writing the indication of the second result to the mode register based at least in part on configuring the logic for health monitoring according to the second configuration; and
outputting the indication of the second result from the mode register.

10. The method of claim 9, further comprising:
receiving a first command to read the mode register, wherein outputting the indication of the first result from the mode register is based at least in part on the first command; and
receiving a second command to read the mode register, wherein outputting the indication of the second result from the mode register is based at least in part on the second command.

11. The method of claim 1, further comprising:
receiving one or more commands to write a mode register of the memory device, wherein receiving the one or more indications to evaluate the logic for health monitoring is based at least in part on reading the mode register.

12. A method, comprising:
transmitting, to a memory device by a host device, one or more indications to evaluate logic for health monitoring of the memory device according to both a first configuration of the logic for health monitoring and a second configuration of the logic for health monitoring;
receiving, based at least in part on transmitting the one or more indications to evaluate the logic for health monitoring, a first indication of a first result of the logic for health monitoring according to the first configuration and a second indication of a second result of the logic for health monitoring according to the second configuration; and
evaluating a condition of the memory device based at least in part on comparing the first result with the second result.

13. The method of claim 12, further comprising:
transmitting an indication of a status of the memory device based at least in part on the first result being the same as the second result.

14. The method of claim 12, further comprising:
transmitting, based at least in part on the first result being different than the second result, an indication of a degradation level for evaluating the memory device using the logic for health monitoring; and
receiving, based at least in part on transmitting the indication of the degradation level, an indication of whether the memory device satisfies the degradation level.

15. The method of claim 12, wherein:
the first configuration is associated with a first level of degradation for the logic for health monitoring; and
the second configuration is associated with a second level of degradation for the logic for health monitoring.

16. The method of claim 15, wherein the one or more indications comprise an indication of the first level of degradation and an indication of the second level of degradation.

17. The method of claim 12, wherein the one or more indications to evaluate the logic for health monitoring comprise a single indication to evaluate the logic for health monitoring according to both the first configuration and the second configuration.

18. The method of claim 12, wherein the one or more indications to evaluate the logic for health monitoring comprise a first indication to evaluate the logic for health monitoring according to the first configuration and a second indication to evaluate the logic for health monitoring according to the second configuration.

19. The method of claim 12, further comprising:
transmitting one or more commands to read a mode register of the memory device, wherein receiving the first indication of the first result and receiving the second indication of the second result are based at least in part on transmitting the one or more commands to read the mode register.

20. The method of claim 12, further comprising:
transmitting one or more commands to write a mode register of the memory device, wherein transmitting the one or more indications to evaluate the logic for health monitoring is based at least in part on transmitting the one or more commands to write the mode register.

21. A memory device, comprising:
one or more memory arrays; and
logic coupled with the one or more memory arrays and configured to cause the memory device to:
receive, at a memory device from a host device, one or more indications to evaluate logic for health monitoring of the memory device according to both a first configuration of the logic for health monitoring and a second configuration of the logic for health monitoring;
output, based at least in part on the one or more indications to evaluate the logic for health monitoring, an indication of a first result of the logic for health monitoring according to the first configuration of the logic for health monitoring; and
output, based at least in part on the one or more indications to evaluate the logic for health monitoring, an indication of a second result of the logic for health monitoring according to the second configuration of the logic for health monitoring.

22. The memory device of claim 21, wherein the logic is configured to cause the memory device to:
configure the logic for health monitoring according to the first configuration based at least in part on receiving the one or more indications to evaluate the logic for health monitoring;

generate the first result based at least in part on configuring the logic for health monitoring according to the first configuration;

configure the logic for health monitoring according to the second configuration based at least in part on receiving the one or more indications to evaluate the logic for health monitoring; and generate the second result based at least in part on configuring the logic for health monitoring according to the second configuration.

23. The memory device of claim 22, wherein the logic is configured to cause the memory device to:

configure the logic for health monitoring according to the first configuration based at least in part on configuring the logic for health monitoring in accordance with a first output value of the logic for health monitoring; and configure the logic for health monitoring according to the first configuration based at least in part on configuring the logic for health monitoring in accordance with a second output value of the logic for health monitoring.

24. The memory device of claim 22, wherein the logic is configured to cause the memory device to:

configure the logic for health monitoring according to the first configuration based at least in part on configuring the logic for health monitoring in accordance with a first level of degradation; and configure the logic for health monitoring according to the second configuration based at least in part on configuring the logic for health monitoring in accordance with a second level of degradation.

25. The memory device of claim 24 wherein the one or more indications comprise an indication of the first level of degradation and an indication of the second level of degradation.

26. The memory device of claim 24, wherein:

the indication of the first result comprises an indication of whether a degradation level of the memory device satisfies the first level of degradation; and the indication of the second result comprises an indication of whether the degradation level of the memory device satisfies the second level of degradation.

27. A host device, comprising:

logic operable to couple with a memory device, the logic configured to cause the host device to:

transmit, to the memory device by the host device, one or more indications to evaluate logic for health monitoring of the memory device according to both a first configuration of the logic for health monitoring and a second configuration of the logic for health monitoring;

receive, based at least in part on transmitting the one or more indications to evaluate the logic for health monitoring, a first indication of a first result of the logic for health monitoring according to the first configuration and a second indication of a second result of the logic for health monitoring according to the second configuration; and evaluate a condition of the memory device based at least in part on comparing the first result with the second result.

28. The host device of claim 27, wherein the logic is configured to cause the host device to:

transmit an indication of a status of the memory device based at least in part on the first result being the same as the second result.

29. The host device of claim 27, wherein the logic is configured to cause the host device to:

transmit, based at least in part on the first result being different than the second result, an indication of a degradation level for evaluating the memory device using the logic for health monitoring; and receive, based at least in part on transmitting the indication of the degradation level, an indication of whether the memory device satisfies the degradation level.

30. The host device of claim 27, wherein:

the first configuration is associated with a first level of degradation for the logic for health monitoring; and the second configuration is associated with a second level of degradation for the logic for health monitoring.

31. The host device of claim 30, wherein the one or more indications comprise an indication of the first level of degradation and an indication of the second level of degradation.

32. A method, comprising:

receiving, at a memory device from a host device, a condition associated with a test mode of the memory device;

configuring, based at least in part on identifying the condition associated with the test mode, logic for health monitoring of the memory device in accordance with evaluating a first level of degradation;

outputting, based at least in part on configuring the logic for health monitoring in accordance with evaluating the first level of degradation, an indication of a first result of the logic for health monitoring;

configuring, based at least in part on identifying the condition associated with the test mode, the logic for health monitoring in accordance with evaluating a second level of degradation; and outputting, based at least in part on configuring the logic for health monitoring in accordance with evaluating the second level of degradation, an indication of a second result of the logic for health monitoring.

33. The method of claim 32, further comprising:

receiving a first indication of the first level of degradation and a second indication of the second level of degradation, wherein configuring the logic for health monitoring in accordance with evaluating the first level of degradation is based at least in part on the first indication and configuring the logic for health monitoring in accordance with evaluating the second level of degradation is based at least in part on the second indication.

34. The method of claim 32, further comprising:

writing the indication of the first result to a mode register;

outputting the indication of the first result from the mode register;

writing the indication of the second result to the mode register; and outputting the indication of the second result from the mode register.

35. The method of claim 34, further comprising:

receiving a first command to read the mode register, wherein outputting the indication of the first result from the mode register is based at least in part on the first command; and receiving a second command to read the mode register, wherein outputting the indication of the second result from the mode register is based at least in part on the second command.

* * * * *